(12) United States Patent
Manolakos et al.

(10) Patent No.: US 11,601,235 B2
(45) Date of Patent: Mar. 7, 2023

(54) DETERMINATION OF POSITIONING REFERENCE SIGNAL RESOURCES IN OUT-OF-COVERAGE SIDELINK-ASSISTED COOPERATIVE POSITIONING

(71) Applicant: QUALCOMM Incorporated, San Diego, CA (US)

(72) Inventors: Alexandros Manolakos, Escondido, CA (US); Seyedkianoush Hosseini, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 17/160,029

(22) Filed: Jan. 27, 2021

(65) Prior Publication Data

US 2021/0297206 A1   Sep. 23, 2021

Related U.S. Application Data

(60) Provisional application No. 62/991,895, filed on Mar. 19, 2020.

(51) Int. Cl.
*H04L 5/00* (2006.01)
*H04W 72/0446* (2023.01)
(Continued)

(52) U.S. Cl.
CPC .......... *H04L 5/0023* (2013.01); *H04L 5/0051* (2013.01); *H04W 72/0446* (2013.01);
(Continued)

(58) Field of Classification Search
CPC ... H04L 5/0023; H04L 5/0051; H04L 5/0048; H04L 5/0094; H04L 5/0053;
(Continued)

(56) References Cited

U.S. PATENT DOCUMENTS

2016/0095080 A1* 3/2016 Khoryaev ............. G01S 5/0284
455/456.1
2016/0095092 A1* 3/2016 Khoryaev ............... H04W 4/50
370/329

(Continued)

FOREIGN PATENT DOCUMENTS

| WO | 2018068817 A1 | 4/2018 |
| WO | 2019133495 A1 | 7/2019 |
| WO | 2019197036 A1 | 10/2019 |

OTHER PUBLICATIONS

Intel Corporation: "Analysis of Anchored and Non-Anchored D2D Aided Positioning", 3GPP TSG RAN WG1 Meeting #82, 3GPP Draft; R1-153991 Intel—D2D Trilateration, 3rd Generation Partnership Project (3GPP), Mobile Competence Centre; 650, Route Des Lucioles; F-06921 Sophia-Antipolis Cedex; France, vol. RAN WG1, No. Beijing, China; Aug. 24, 2015-Aug. 28, 2015, Aug. 23, 2015 (Aug. 23, 2015), pp. 1-6, XP051001398, Retrieved from the Internet: URL: http://www.3gpp.org/ftp/Meetings_3GPP_SYNC/RAN1/Docs/ [retrieved on Aug. 23, 2015].

(Continued)

*Primary Examiner* — Thai Nguyen
(74) *Attorney, Agent, or Firm* — Campbell Chiang

(57) ABSTRACT

Disclosed are techniques for wireless communication. In an aspect, an assisting user equipment (UE) receives a request to perform a positioning procedure from a target UE over a sidelink between the assisting UE and the target UE, wherein the assisting UE and the target UE are both out of network coverage, determines, based at least on the request, a set of time and/or frequency resources on which to transmit one or more positioning reference signals for the positioning procedure, and transmits the one or more positioning reference signals to the target UE via the set of time and/or frequency resources.

84 Claims, 14 Drawing Sheets

(51) Int. Cl.
*H04W 72/0453* (2023.01)
*H04W 72/20* (2023.01)
*H04W 92/18* (2009.01)

(52) U.S. Cl.
CPC ....... *H04W 72/0453* (2013.01); *H04W 72/20* (2023.01); *H04W 92/18* (2013.01)

(58) Field of Classification Search
CPC ............ H04L 5/0037; H04W 72/0406; H04W 72/0446; H04W 72/0453; H04W 92/18; H04W 88/04; H04W 76/14; H04W 64/00; H04W 64/003; G01S 5/0205
See application file for complete search history.

(56) References Cited

U.S. PATENT DOCUMENTS

2017/0212206 A1*  7/2017  Kim ...................... G01S 5/0063
2022/0110085 A1*  4/2022  Khoryaev ............. H04L 5/0051

OTHER PUBLICATIONS

International Search Report and Written Opinion—PCT/US2021/015514—ISA/EPO—dated May 11, 2021.

\* cited by examiner

DETERMINATION OF POSITIONING REFERENCE SIGNAL RESOURCES IN OUT-OF-COVERAGE SIDELINK-ASSISTED COOPERATIVE POSITIONING

CROSS-REFERENCE TO RELATED APPLICATIONS

The present Application for patent claims the benefit of U.S. Provisional Application No. 62/991,895, entitled "DETERMINATION OF POSITIONING REFERENCE SIGNAL RESOURCES IN OUT-OF-COVERAGE SIDELINK-ASSISTED COOPERATIVE POSITIONING," filed Mar. 19, 2020, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for wireless communication performed at an assisting user equipment (UE) includes receiving a request to perform a positioning procedure from a target UE over a sidelink between the assisting UE and the target UE, wherein the assisting UE and the target UE are both out of network coverage; determining, based at least on the request, a set of time and/or frequency resources on which to transmit one or more positioning reference signals for the positioning procedure; and transmitting the one or more positioning reference signals to the target UE via the set of time and/or frequency resources.

In an aspect, a method for wireless communication performed at a target user equipment (UE) includes transmitting a request to perform a positioning procedure to at least one assisting UE over a sidelink between the at least one assisting UE and the target UE, wherein the target UE and the at least one assisting UE are both out of network coverage; determining, based at least on the request, a set of time and/or frequency resources on which to transmit one or more positioning reference signals from the at least one assisting UE for the positioning procedure; and transmitting the one or more positioning reference signals to the at least one assisting UE via the set of time and/or frequency resources.

In an aspect, an assisting user equipment (UE) includes a memory; at least one transceiver; and at least one processor communicatively coupled to the memory and the at least one transceiver, the at least one processor configured to: receive a request to perform a positioning procedure from a target UE over a sidelink between the assisting UE and the target UE, wherein the assisting UE and the target UE are both out of network coverage; determine, based at least on the request, a set of time and/or frequency resources on which to transmit one or more positioning reference signals for the positioning procedure; and cause the at least one transceiver to transmit the one or more positioning reference signals to the target UE via the set of time and/or frequency resources.

In an aspect, a target user equipment (UE) includes a memory; at least one transceiver; and at least one processor communicatively coupled to the memory and the at least one transceiver, the at least one processor configured to: cause the at least one transceiver to transmit a request to perform a positioning procedure to at least one assisting UE over a sidelink between the at least one assisting UE and the target UE, wherein the target UE and the at least one assisting UE are both out of network coverage; determine, based at least on the request, a set of time and/or frequency resources on which to transmit one or more positioning reference signals from the at least one assisting UE for the positioning procedure; and cause the at least one transceiver to transmit the one or more positioning reference signals to the at least one assisting UE via the set of time and/or frequency resources.

In an aspect, an assisting user equipment (UE) includes means for receiving a request to perform a positioning procedure from a target UE over a sidelink between the assisting UE and the target UE, wherein the assisting UE and the target UE are both out of network coverage; means for determining, based at least on the request, a set of time and/or frequency resources on which to transmit one or more positioning reference signals for the positioning procedure; and means for transmitting the one or more positioning reference signals to the target UE via the set of time and/or frequency resources.

In an aspect, a target user equipment (UE) includes means for transmitting a request to perform a positioning procedure to at least one assisting UE over a sidelink between the at least one assisting UE and the target UE, wherein the target UE and the at least one assisting UE are both out of network coverage; means for determining, based at least on the request, a set of time and/or frequency resources on which to transmit one or more positioning reference signals from the at least one assisting UE for the positioning procedure; and means for transmitting the one or more positioning reference signals to the at least one assisting UE via the set of time and/or frequency resources.

In an aspect, a non-transitory computer-readable medium stores a set of instructions. The set of instructions include one or more instructions that, when executed by one or more processors of an assisting user equipment (UE), cause the assisting UE to: receive a request to perform a positioning procedure from a target UE over a sidelink between the assisting UE and the target UE, wherein the assisting UE and the target UE are both out of network coverage; determine, based at least on the request, a set of time and/or frequency resources on which to transmit one or more positioning reference signals for the positioning procedure; and transmit the one or more positioning reference signals to the target UE via the set of time and/or frequency resources.

A non-transitory computer-readable medium stores a set of instructions. The set of instructions include one or more instructions that, when executed by one or more processors of a target user equipment (UE), cause the target UE to: transmit a request to perform a positioning procedure to at least one assisting UE over a sidelink between the at least one assisting UE and the target UE, wherein the target UE and the at least one assisting UE are both out of network coverage; determine, based at least on the request, a set of time and/or frequency resources on which to transmit one or more positioning reference signals from the at least one assisting UE for the positioning procedure; and transmit the one or more positioning reference signals to the at least one assisting UE via the set of time and/or frequency resources.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
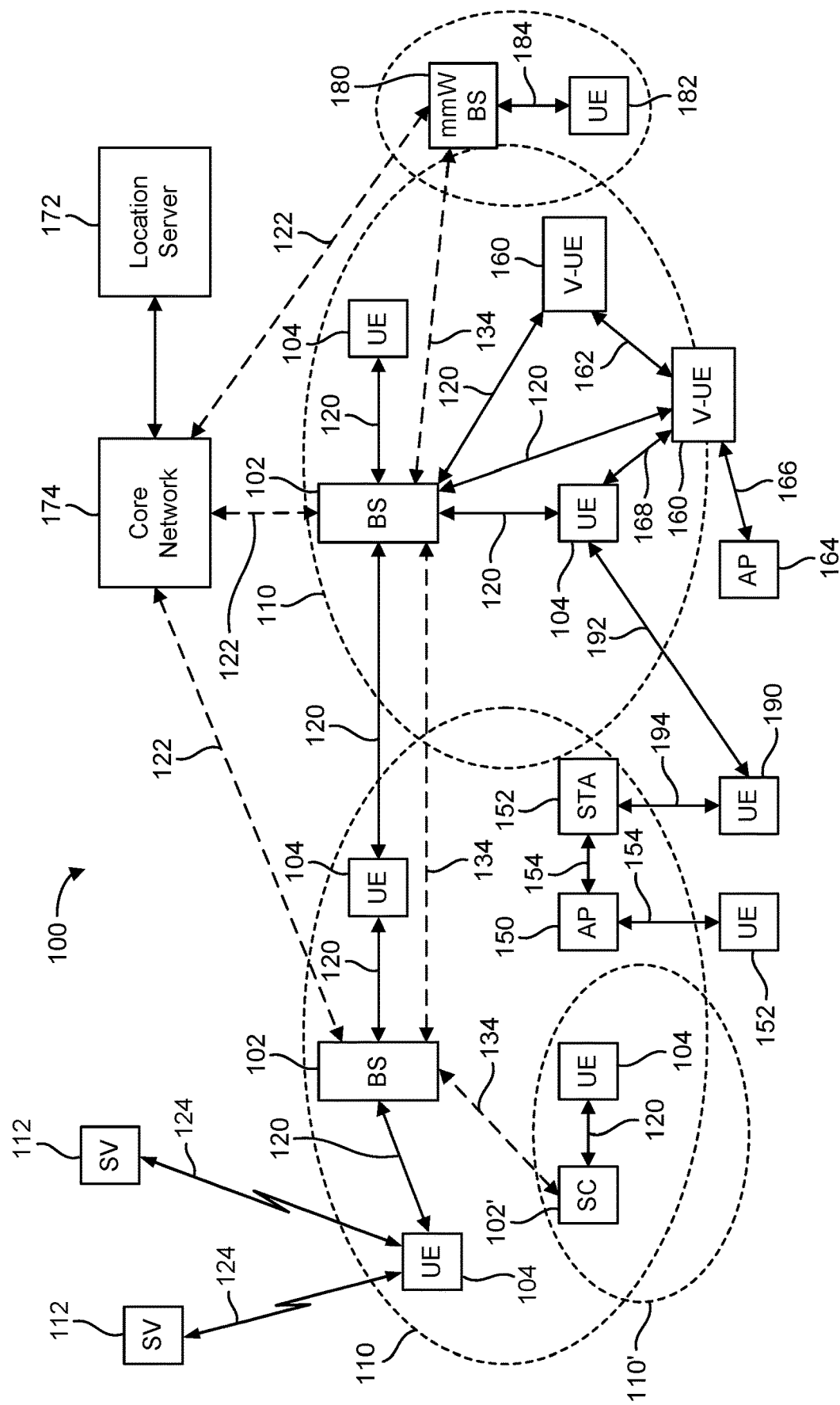
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.).

As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 174 (e.g., an evolved packet core (EPC) or 5G core (5GC)) through backhaul links 122, and through the core network 174 to one or more location servers 172 (which may be part of core network 174 or may be external to core network 174). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 (e.g., using the Uu interface). V-UEs 160 may also communicate directly with each other over a wireless sidelink 162, with a roadside access point 164 (also referred to as a "roadside unit") over a wireless sidelink 166, or with UEs 104 over a wireless sidelink 168. A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-MI) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more roadside access points 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more roadside access points 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards roadside access points 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
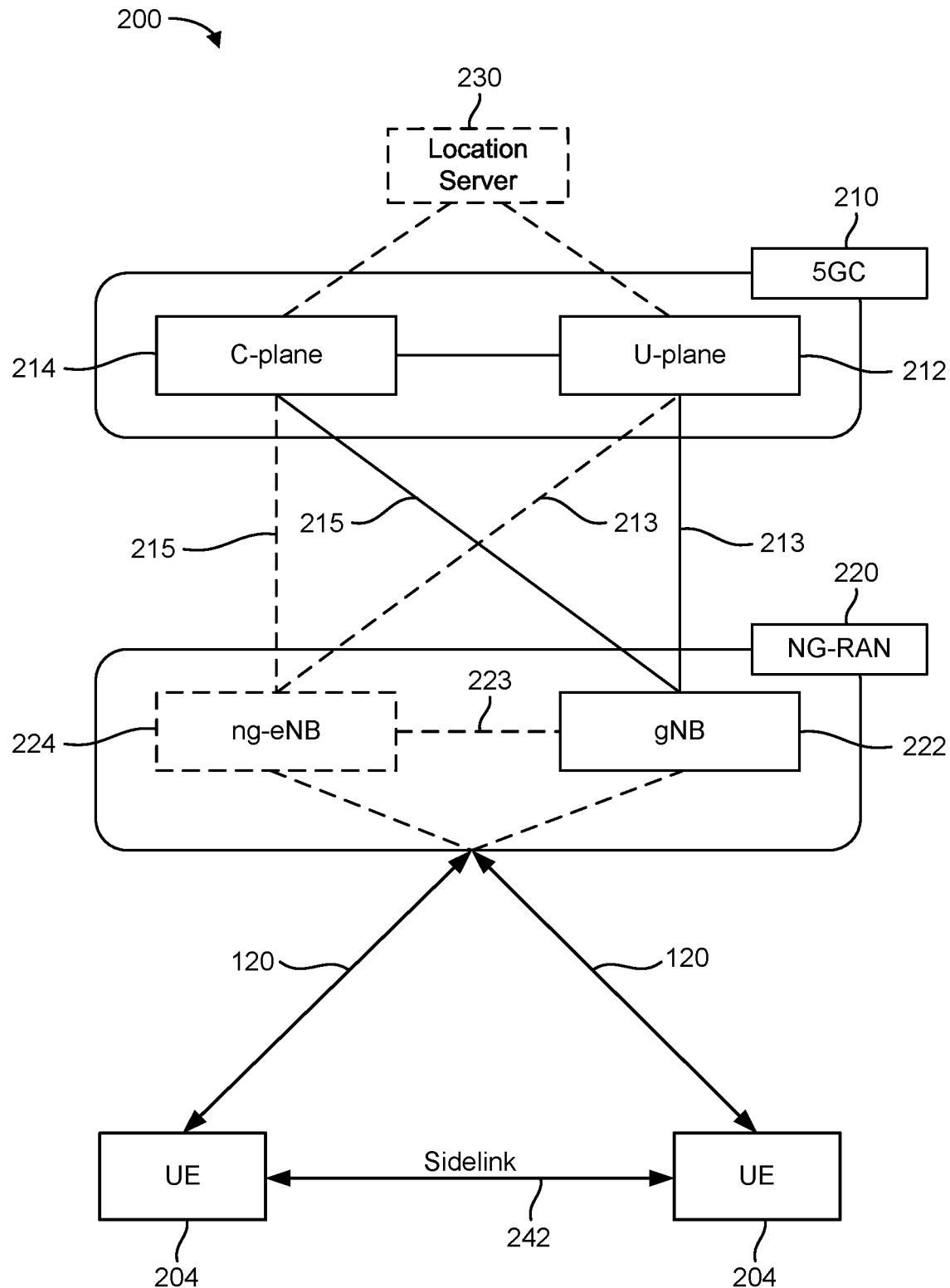
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions (C-plane) 214 (e.g., UE registration, authentication, network access, gateway selection, etc.) and user plane functions (U-plane) 212 (e.g., UE gateway function, access to data networks, IP routing, etc.), which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may only have one or more gNBs 222, while other configurations include one or more of both ng-eNBs 224 and gNBs 222. Either (or both) gNB 222 or ng-eNB 224 may communicate with UEs 204 (e.g., any of the UEs described herein). In an aspect, two or more UEs 204 may communicate with each other over a wireless sidelink 242, which may correspond to wireless sidelink 162 in FIG. 1.

Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
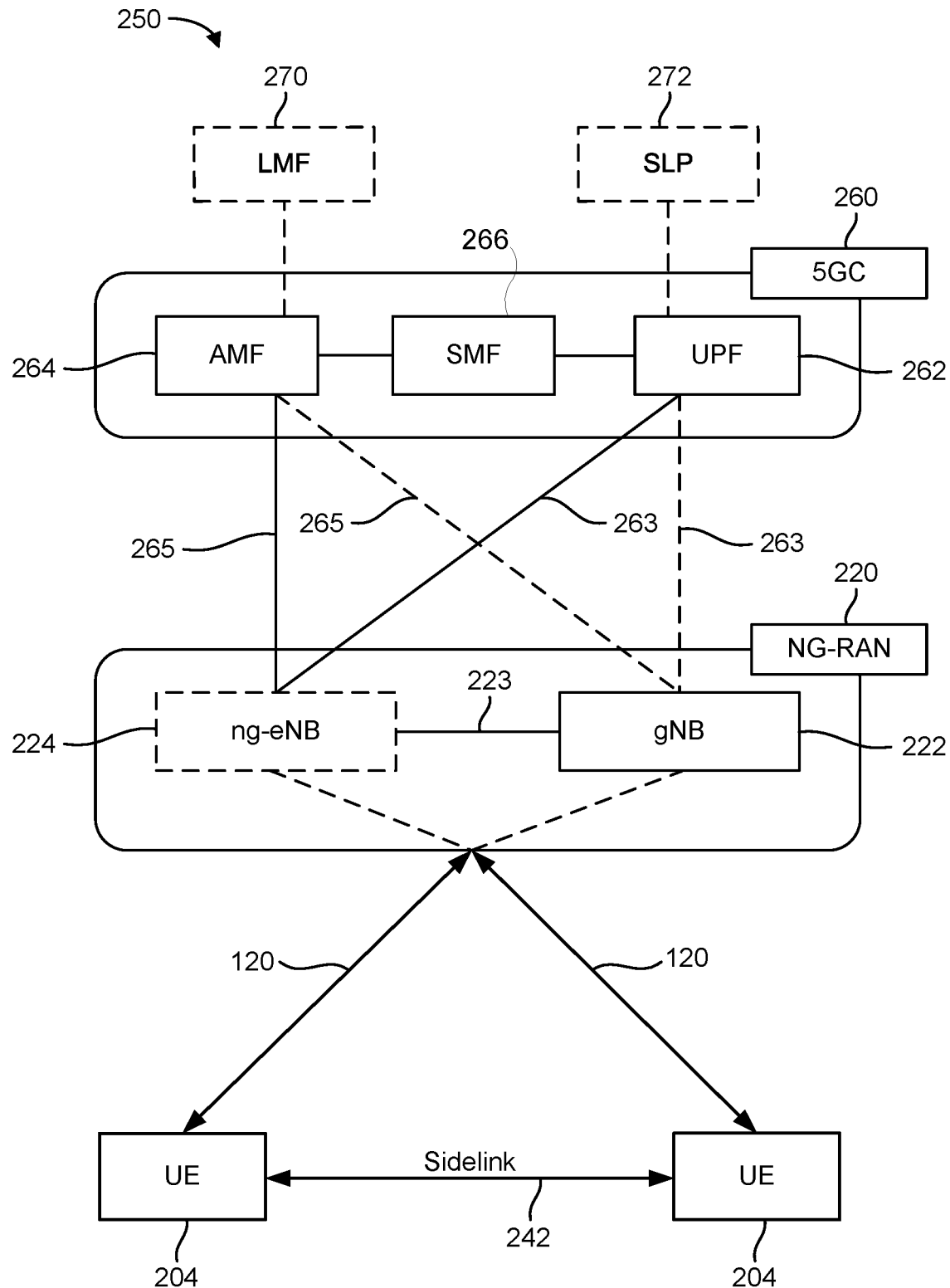

FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the NG-RAN 220 may only have one or more gNBs 222, while other configurations include one or more of both ng-eNBs 224 and gNBs 222. The base stations of the NG-RAN 220 communicate with the AMF 264 over the N2 interface and with the UPF 262 over the N3 interface. Either (or both) gNB 222 or ng-eNB 224 may communicate with UEs 204 (e.g., any of the UEs described herein). In an aspect, two or more UEs 204 may communicate with each other over a sidelink 242, which may correspond to sidelink 162 in FIG. 1.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 which acts as a location server 230, transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270 but, whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g. using protocols intended to carry voice and/or data like the transmission control protocol (TCP) and/or IP).

Figure 3:
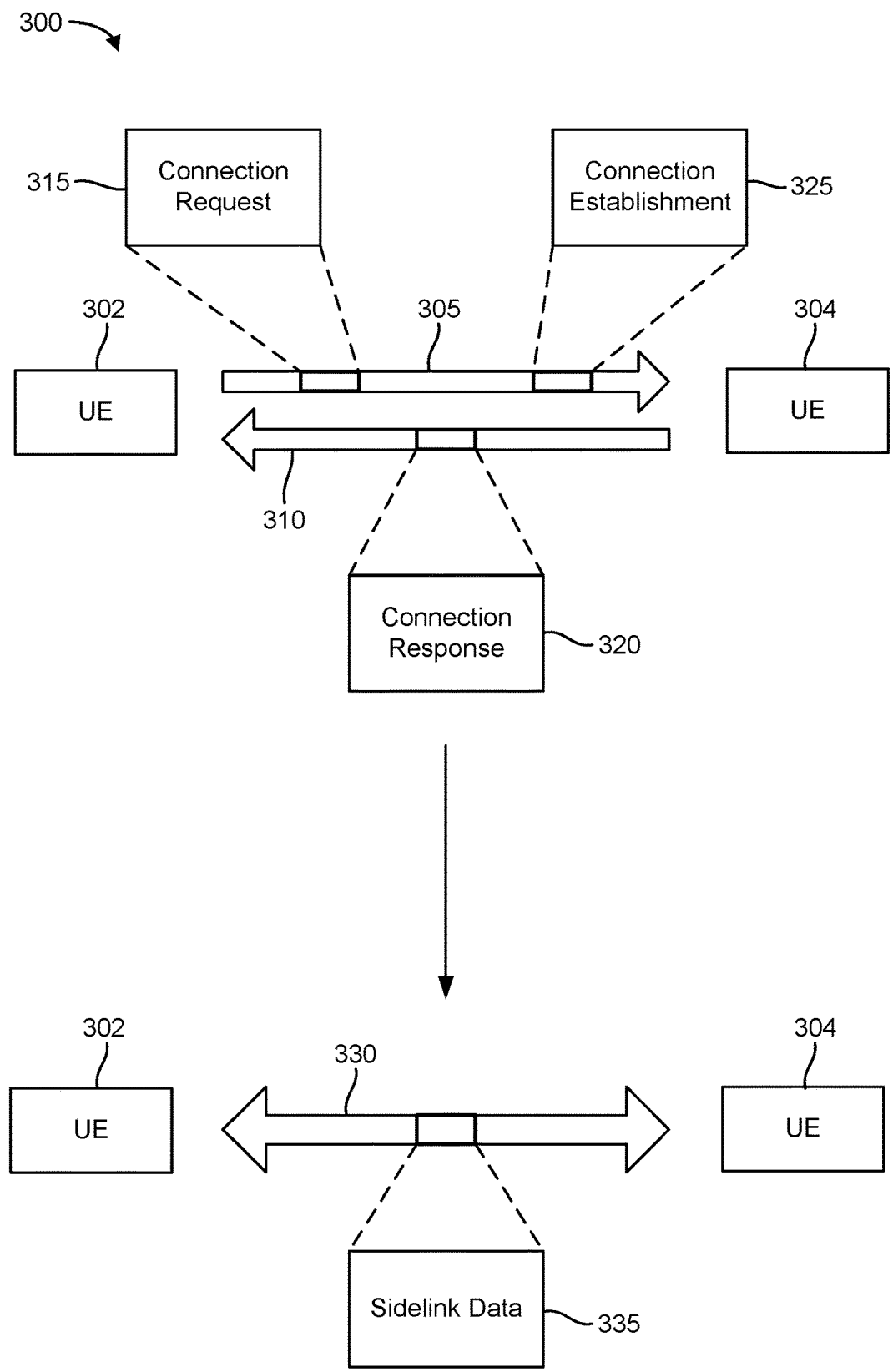
FIG. 3 illustrates an example of a wireless communications system that supports unicast sidelink establishment, according to aspects of the disclosure.

FIG. 3 illustrates an example of a wireless communications system 300 that supports wireless unicast sidelink establishment, according to aspects of the disclosure. In some examples, wireless communications system 300 may implement aspects of wireless communications systems 100, 200, and 250. Wireless communications system 300 may include a first UE 302 and a second UE 304, which may be examples of any of the UEs described herein. As specific examples, UEs 302 and 304 may correspond to V-UEs 160 in FIG. 1, UE 190 and UE 104 in FIG. 1 connected over D2D P2P link 192, or UEs 204 in FIGS. 2A and 2B.

In the example of FIG. 3, the UE 302 may attempt to establish a unicast connection over a sidelink with the UE 304, which may be a V2X sidelink between the UE 302 and UE 304. As specific examples, the established sidelink connection may correspond to sidelinks 162 and/or 168 in FIG. 1 or sidelink 242 in FIGS. 2A and 2B. The sidelink connection may be established in an omni-directional frequency range (e.g., FR1) and/or a mmW frequency range (e.g., FR2). In some cases, the UE 302 may be referred to as an initiating UE that initiates the sidelink connection procedure, and the UE 304 may be referred to as a target UE that is targeted for the sidelink connection procedure by the initiating UE.

For establishing the unicast connection, access stratum (AS) (a functional layer in the UMTS and LTE protocol stacks between the RAN and the UE that is responsible for transporting data over wireless links and managing radio resources, and which is part of Layer 2) parameters may be configured and negotiated between the UE 302 and UE 304. For example, a transmission and reception capability matching may be negotiated between the UE 302 and UE 304. Each UE may have different capabilities (e.g., transmission and reception, 64 quadrature amplitude modulation (QAM), transmission diversity, carrier aggregation (CA), supported communications frequency band(s), etc.). In some cases, different services may be supported at the upper layers of corresponding protocol stacks for UE 302 and UE 304. Additionally, a security association may be established between UE 302 and UE 304 for the unicast connection. Unicast traffic may benefit from security protection at a link level (e.g., integrity protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 302 and UE 304.

In some cases, UE 304 may create a service announcement (e.g., a service capability message) to transmit over a cellular network (e.g., cV2X) to assist the sidelink connection establishment. Conventionally, UE 302 may identify and locate candidates for sidelink communications based on a basic service message (BSM) broadcasted unencrypted by nearby UEs (e.g., UE 304). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 302 is able to detect the BSM(s). Accordingly, the service announcement transmitted by UE 304 and other nearby UEs (e.g., a discovery signal) may be an upper layer signal and broadcasted (e.g., in an NR sidelink broadcast). In some cases, the UE 304 may include one or more parameters for itself in the service announcement, including connection parameters and/or capabilities it possesses. The UE 302 may then monitor for and receive the broadcasted service announcement to identify potential UEs for corresponding sidelink connections. In some cases, the UE 302 may identify the potential UEs based on the capabilities each UE indicates in their respective service announcements.

The service announcement may include information to assist the UE 302 (e.g., or any initiating UE) to identify the UE transmitting the service announcement (UE 304 in the example of FIG. 3). For example, the service announcement may include channel information where direct communication requests may be sent. In some cases, the channel information may be RAT-specific (e.g., specific to LTE or NR) and may include a resource pool within which UE 302 transmits the communication request. Additionally, the service announcement may include a specific destination address for the UE (e.g., a Layer 2 destination address) if the destination address is different from the current address (e.g., the address of the streaming provider or UE transmitting the service announcement). The service announcement may also include a network or transport layer for the UE 302 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and QoS-related parameters.

After identifying a potential sidelink connection target (UE 304 in the example of FIG. 3), the initiating UE (UE 302 in the example of FIG. 3) may transmit a connection request 315 to the identified target UE 304. In some cases, the connection request 315 may be a first RRC message transmitted by the UE 302 to request a unicast connection with the UE 304 (e.g., an "RRCDirectConnectionSetupRequest" message). For example, the unicast connection may utilize the PC5 interface for the sidelink, and the connection request 315 may be an RRC connection setup request message. Additionally, the UE 302 may use a sidelink signaling radio bearer 305 to transport the connection request 315.

After receiving the connection request 315, the UE 304 may determine whether to accept or reject the connection request 315. The UE 304 may base this determination on a transmission/reception capability, an ability to accommodate the unicast connection over the sidelink, a particular service indicated for the unicast connection, the contents to be transmitted over the unicast connection, or a combination thereof. For example, if the UE 302 wants to use a first RAT to transmit or receive data, but the UE 304 does not support the first RAT, then the UE 304 may reject the connection request 315. Additionally or alternatively, the UE 304 may reject the connection request 315 based on being unable to accommodate the unicast connection over the sidelink due to limited radio resources, a scheduling issue, etc. Accordingly, the UE 304 may transmit an indication of whether the request is accepted or rejected in a connection response 320. Similar to the UE 302 and the connection request 315, the UE 304 may use a sidelink signaling radio bearer 310 to transport the connection response 320. Additionally, the connection response 320 may be a second RRC message transmitted by the UE 304 in response to the connection request 315 (e.g., an "RRCDirectConnectionResponse" message).

In some cases, sidelink signaling radio bearers 305 and 310 may be the same sidelink signaling radio bearer or may be separate sidelink signaling radio bearers. Accordingly, a radio link control (RLC) layer acknowledged mode (AM) may be used for sidelink signaling radio bearers 305 and 310. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 320 indicates that the UE 304 accepted the connection request 315, the UE 302 may then transmit a connection establishment 325 message on the sidelink signaling radio bearer 305 to indicate that the unicast connection setup is complete. In some cases, the connection establishment 325 may be a third RRC message (e.g., an "RRCDirectConnectionSetupComplete" message). Each of the connection request 315, the connection response 320, and the connection establishment 325 may use a basic capability when being transported from one UE to the other UE to enable each UE to be able to receive and decode the corresponding transmission (e.g., the RRC messages).

Additionally, identifiers may be used for each of the connection request 315, the connection response 320, and the connection establishment 325. For example, the identifiers may indicate which UE 302/304 is transmitting which message and/or for which UE 302/304 the message is intended. For physical (PHY) layer channels, the RRC signaling and any subsequent data transmissions may use the same identifier (e.g., Layer 2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a physical layer ACK may be used for ensuring the corresponding messages are transmitted and received properly.

One or more information elements may be included in the connection request 315 and/or the connection response 320 for UE 302 and/or UE 304, respectively, to enable negotiation of corresponding AS layer parameters for the unicast connection. For example, the UE 302 and/or UE 304 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, the UE 302 and/or UE 304 may include RLC parameters when establishing the unicast connection to set an RLC context for the unicast connection. For example, the RLC context may indicate whether an AM (e.g., a reordering timer (t-reordering) is used) or an unacknowledged mode (UM) is used for the RLC layer of the unicast communications.

Additionally, the UE 302 and/or UE 304 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (HACK) feedback), parameters for the HARQ feedback scheme, carrier aggregation, or a combination thereof for the unicast connection. Additionally, the UE 302 and/or UE 304 may include PHY layer parameters when establishing the unicast connection to set a PHY layer context for the unicast connection. For example, the PHY layer context may indicate a transmission format (unless transmission profiles are included for each UE 302/304) and a radio resource configuration (e.g., bandwidth part (BWP), numerology, etc.) for the unicast connection. These information elements may be supported for different frequency range configurations (e.g., FR1 and FR2).

In some cases, a security context may also be set for the unicast connection (e.g., after the connection establishment 325 message is transmitted). Before a security association (e.g., security context) is established between the UE 302 and UE 304, the sidelink signaling radio bearers 305 and 310 may not be protected. After a security association is established, the sidelink signaling radio bearers 305 and 310 may be protected. Accordingly, the security context may enable secure data transmissions over the unicast connection and the sidelink signaling radio bearers 305 and 310. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, the UE 304 may base its decision on whether to accept or reject the connection request 315 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, the UE 302 and UE 304 may communicate using the unicast connection over a sidelink 330, where sidelink data 335 is transmitted between the two UEs 302 and 304. The sidelink 330 may correspond to sidelinks 162 and/or 168 in FIG. 1 and/or sidelink 242 in FIGS. 2A and 2B. In some cases, the sidelink data 335 may include RRC messages transmitted between the two UEs 302 and 304. To maintain this unicast connection on sidelink 330, UE 302 and/or UE 304 may transmit a keep alive message (e.g., "RRCDirectLinkAlive" message, a fourth RRC message, etc.). In some cases, the keep alive message may be triggered periodically or on-demand (e.g., event-triggered). Accordingly, the triggering and transmission of the keep alive message may be invoked by UE 302 or by both UE 302 and UE 304. Additionally or alternatively, a MAC control element (CE) (e.g., defined over sidelink 330) may be used to monitor the status of the unicast connection on sidelink 330 and maintain the connection. When the unicast connection is no longer needed (e.g., UE 302 travels far enough away from UE 304), either UE 302 and/or UE 304 may start a release procedure to drop the unicast connection over sidelink 330. Accordingly, subsequent RRC messages may not be transmitted between UE 302 and UE 304 on the unicast connection.

Figure 4:
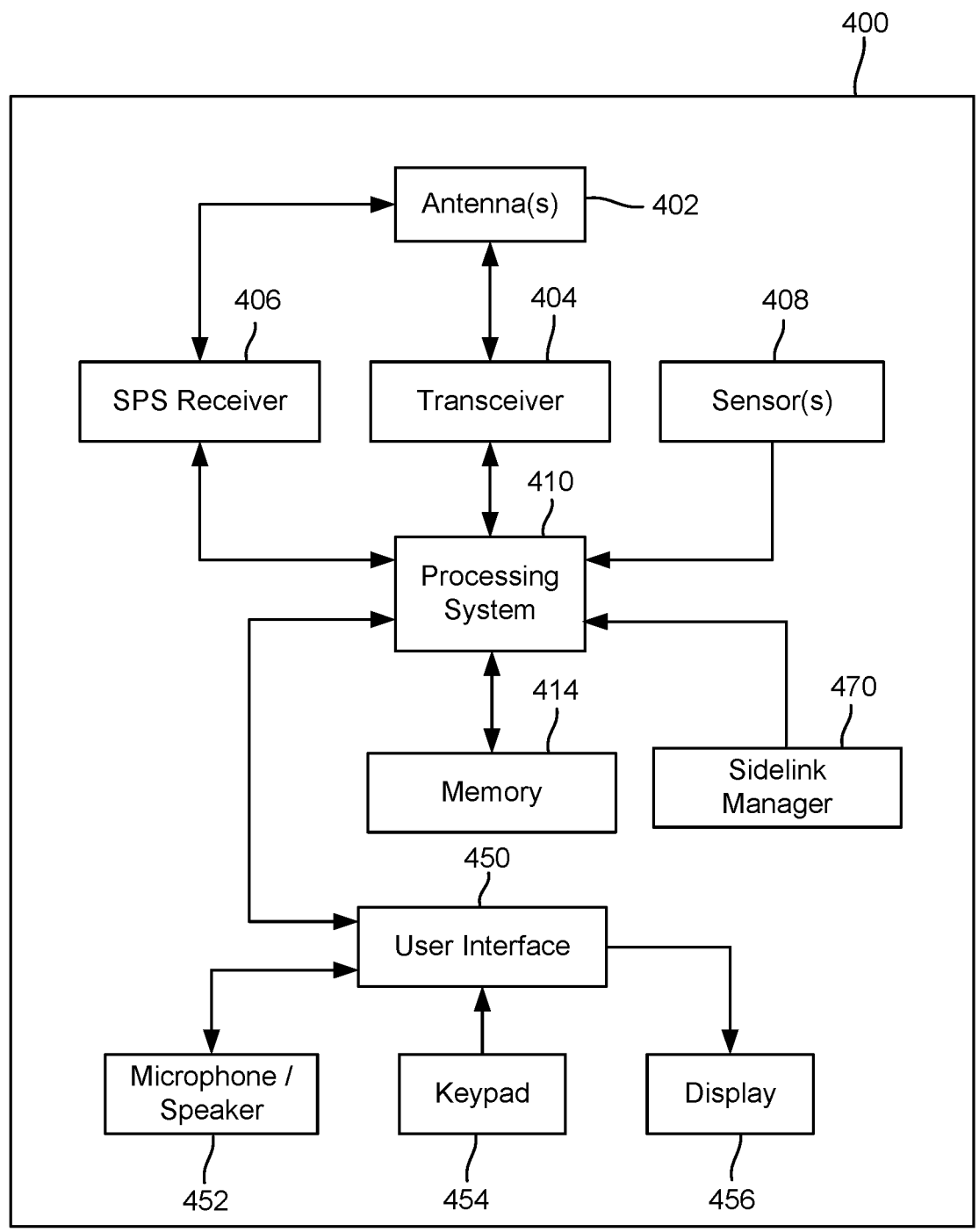
FIG. 4 is a block diagram illustrating various components of an example user equipment (UE), according to aspects of the disclosure.

FIG. 4 is a block diagram illustrating various components of an example UE 400, according to aspects of the disclosure. In an aspect, the UE 400 may correspond to any of the UEs described herein. As a specific example, the UE 400 may be a V-UE, such as V-UE 160 in FIG. 1. For the sake of simplicity, the various features and functions illustrated in the block diagram of FIG. 4 are connected together using a common data bus that is meant to represent that these various features and functions are operatively coupled together. Those skilled in the art will recognize that other connections, mechanisms, features, functions, or the like, may be provided and adapted as necessary to operatively couple and configure an actual UE. Further, it is also recognized that one or more of the features or functions illustrated in the example of FIG. 4 may be further subdivided, or two or more of the features or functions illustrated in FIG. 4 may be combined.

The UE 400 may include at least one transceiver 404 connected to one or more antennas 402 and providing means for communicating (e.g., means for transmitting, means for receiving, means for measuring, means for tuning, means for refraining from transmitting, etc.) with other network nodes, such as V-UEs (e.g., V-UEs 160), infrastructure access points (e.g., roadside access point 164), P-UEs (e.g., UEs 104), base stations (e.g., base stations 102), etc., via at least one designated RAT (e.g., cV2X or IEEE 802.11p) over one or more communication links (e.g., communication links 120, sidelinks 162, 166, 168, mmW communication link 184). The transceiver 404 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include at least one transmitter and at least one receiver in an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antenna(s) 402), such as an antenna array, that permits the UE 400 to perform transmit "beamforming," as described herein. Similarly, a receiver may include or be coupled to a plurality of antennas (e.g., antenna(s) 402), such as an antenna array, that permits the UE 400 to perform receive beamforming, as described herein. In an aspect, the transmitter(s) and receiver(s) may share the same plurality of antennas (e.g., antenna(s) 402), such that the UE 400 can only receive or transmit at a given time, not both at the same time. In some cases, a transceiver may not provide both transmit and receive functionalities. For example, a low functionality receiver circuit may be employed in some designs to reduce costs when providing full communication is not necessary (e.g., a receiver chip or similar circuitry simply providing low-level sniffing).

The UE 400 may also include a satellite positioning service (SPS) receiver 406. The SPS receiver 406 may be connected to the one or more antennas 402 and may provide means for receiving and/or measuring satellite signals. The SPS receiver 406 may comprise any suitable hardware and/or software for receiving and processing SPS signals, such as global positioning system (GPS) signals. The SPS receiver 406 requests information and operations as appropriate from the other systems, and performs the calculations necessary to determine the UE's 400 position using measurements obtained by any suitable SPS algorithm.

One or more sensors 408 may be coupled to a processing system 410 and may provide means for sensing or detecting information related to the state and/or environment of the UE 400, such as speed, heading (e.g., compass heading), headlight status, gas mileage, etc. By way of example, the one or more sensors 408 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The processing system 410 may include one or more microprocessors, microcontrollers, ASICs, processing cores, digital signal processors, or the like that provide processing functions, as well as other calculation and control functionality. The processing system 410 may therefore provide means for processing, such as means for determining, means for calculating, means for receiving, means for transmitting, means for indicating, etc. The processing system 410 may include any form of logic suitable for performing, or causing the components of the UE 400 to perform, at least the techniques described herein.

The processing system 410 may also be coupled to a memory 414 providing means for storing (including means for retrieving, means for maintaining, etc.) data and software instructions for executing programmed functionality within the UE 400. The memory 414 may be on-board the processing system 410 (e.g., within the same integrated circuit (IC) package), and/or the memory 414 may be external to the processing system 410 and functionally coupled over a data bus.

The UE 400 may include a user interface 450 that provides any suitable interface systems, such as a microphone/speaker 452, keypad 454, and display 456 that allow user interaction with the UE 400. The microphone/speaker 452 may provide for voice communication services with the UE 400. The keypad 454 may comprise any suitable buttons for user input to the UE 400. The display 456 may comprise any suitable display, such as, for example, a backlit liquid crystal display (LCD), and may further include a touch screen display for additional user input modes. The user interface 450 may therefore be a means for providing indications (e.g., audible and/or visual indications) to a user and/or for receiving user input (e.g., via user actuation of a sensing device such a keypad, a touch screen, a microphone, and so on).

In an aspect, the UE 400 may include a sidelink manager 470 coupled to the processing system 410. The sidelink manager 470 may be a hardware, software, or firmware component that, when executed, causes the UE 400 to perform the operations described herein. For example, the sidelink manager 470 may be a software module stored in memory 414 and executable by the processing system 410. As another example, the sidelink manager 470 may be a hardware circuit (e.g., an ASIC, a field-programmable gate array (FPGA), etc.) within the UE 400.

Figure 5:
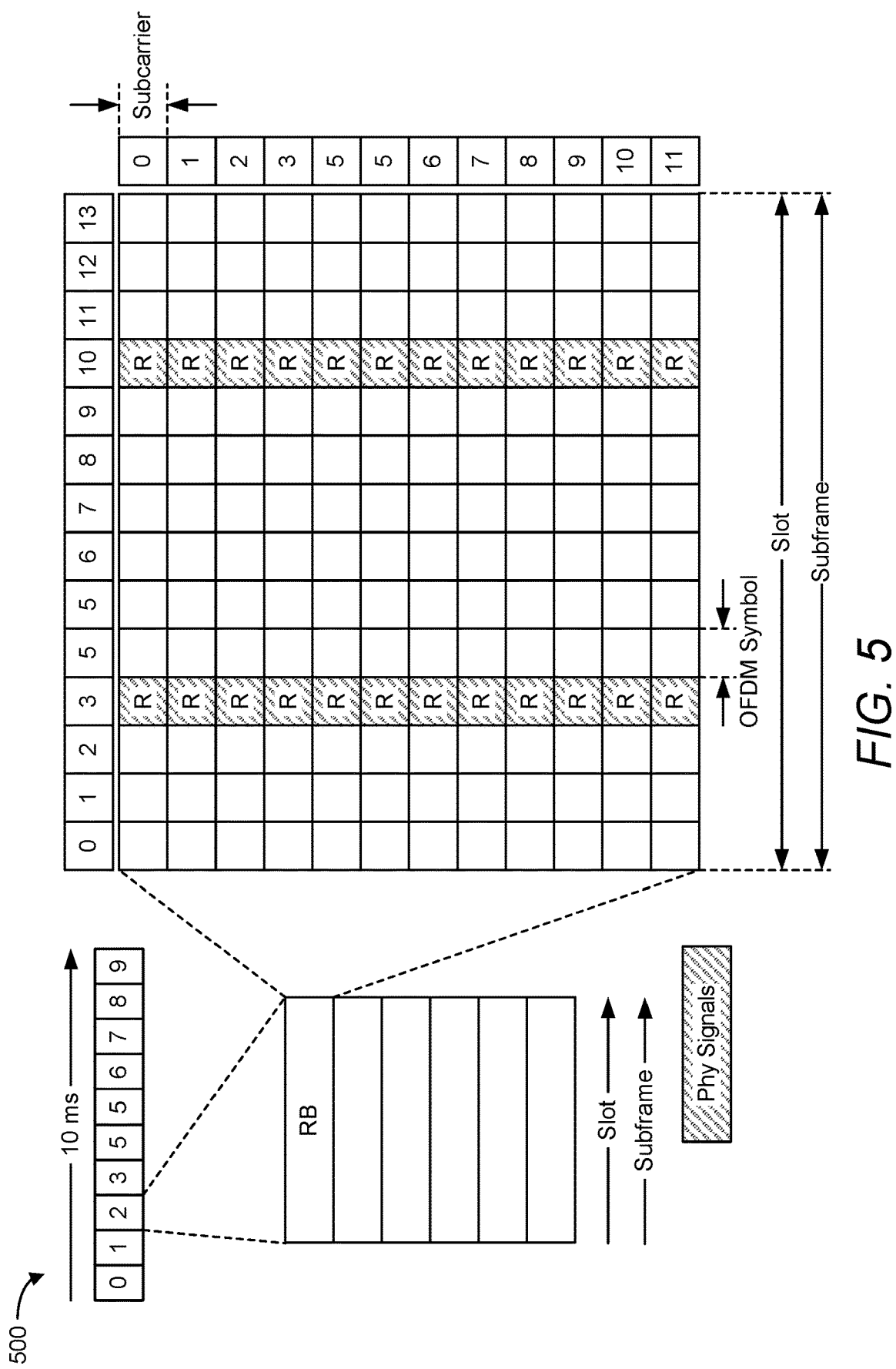
FIG. 5 is a diagram illustrating an example frame structure for use in a wireless telecommunications system, according to aspects of the disclosure.

Communication over a sidelink may use a similar frame structure and numerology as used in LTE and NR. FIG. 5 is a diagram 500 illustrating an example of a frame structure for use on a sidelink, according to aspects of the disclosure. Other wireless communications technologies may have different frame structures and/or different channels.

In LTE and NR, the system bandwidth is partitioned into multiple (K) orthogonal subcarriers, which are also commonly referred to as tones, bins, etc. Each subcarrier may be modulated with data. In general, modulation symbols are sent in the frequency domain with orthogonal frequency division multiplexing (OFDM) and in the time domain with single-carrier frequency division multiplexing (SC-FDM). The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu=1$), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 5, a numerology of 15 kHz is used. Thus, in the time domain, a 10 ms frame is divided into 10 equally sized subframes of 1 ms each, and each subframe includes one time slot. In FIG. 5, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 5, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Various sidelink physical channels can be transmitted on the resource elements of a slot of a radio frame. A sidelink physical channel corresponds to a set of resource elements carrying information originating from higher layers. The following sidelink physical channels are defined for NR sidelinks: a physical sidelink shared channel (PSSCH), a physical sidelink broadcast channel (PSBCH), a physical sidelink control channel (PSCCH), and a physical sidelink feedback channel (PSFCH). These channels are described in 3GPP Technical Specification (TS) 38.211, which is publicly available and is incorporated by reference herein in its entirety.

As illustrated in FIG. 5, some of the resource elements carry physical RF signals. A sidelink physical signal corresponds to a set of resource elements used by the physical layer and does not carry information originating from higher layers. The following sidelink physical signals are defined for NR sidelinks: demodulation reference signals (DMRS), channel state information reference signals (CSI-RS), phase-tracking reference signals (PT-RS), sidelink primary synchronization signals (S-PSS), and sidelink secondary synchronization signals (S-SSS), example locations of which are labeled "R" in FIG. 5. These signals are described in 3GPP TS 38.211. In addition, a UE can transmit positioning reference signals (PRS), tracking reference signals (TRS), or the like for positioning purposes.

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

Note that the terms "positioning reference signal" and "PRS" generally refer to specific reference signals that are used for positioning in NR and LTE systems. However, as used herein, the terms "positioning reference signal" and "PRS" refer to any type of reference signal that can be used for positioning, such as but not limited to, PRS as defined in LTE and NR, tracking reference signals (TRS), phase tracking reference signals (PT-RS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), uplink positioning reference signals (UL-PRS), etc. In addition, the terms "positioning reference signal" and "PRS" may refer to downlink, uplink, or sidelink positioning reference signals, unless otherwise indicated by the context. If needed to further distinguish the type of PRS, a downlink positioning reference signal may be referred to as a "DL-PRS," an uplink positioning reference signal (e.g., an SRS-for-positioning, PT-RS) may be referred to as an "UL-PRS," and a sidelink positioning reference signal may be referred to as an "SL-PRS." In addition, for signals that may be transmitted in uplink, downlink, and sidelink directions (e.g., DMRS, PT-RS, etc.), the signals may be prepended with "UL," "DL," or "SL," respectively, to distinguish the direction. For example, "UL-DMRS" may be differentiated from "SL-DMRS."

Figure 6:
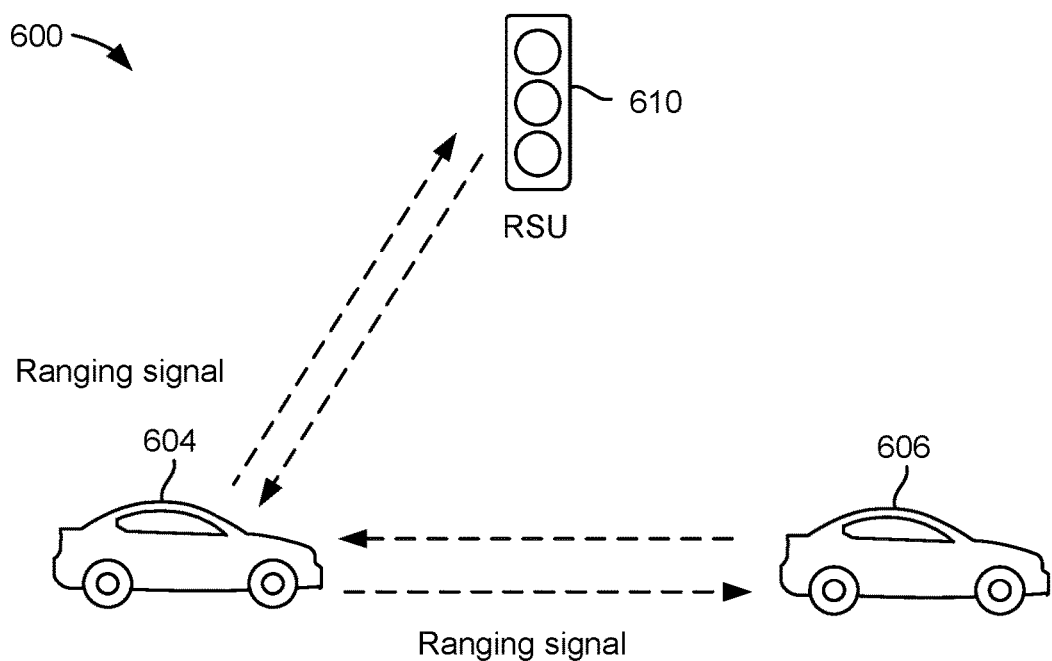
FIG. 6 illustrates an example wireless communication system in which a vehicle user equipment (V-UE) is exchanging ranging signals with a roadside unit (RSU) and another V-UE, according to aspects of the disclosure.

Link-level ranging signals can be used to estimate the distance between pairs of V-UEs or between a V-UE and a roadside unit (RSU). FIG. 6 illustrates an example wireless communication system 600 in which a V-UE 604 is exchanging ranging signals with an RSU 610 and another V-UE 606, according to aspects of the disclosure. As illustrated in FIG. 6, a wideband (e.g., FR1) ranging signal (e.g., a Zadoff Chu sequence) is transmitted by both end points (e.g., V-UE 604 and RSU 610 and V-UE 604 and V-UE 606). In an aspect, the ranging signals may be positioning reference signals (e.g., SL-PRS). On receiving a ranging signal from a transmitter (e.g., V-UE 604), the receiver (e.g., RSU 610 and/or V-UE 606) estimates the time of arrival (ToA) of the first multipath of the ranging signal using channel estimation. The receiver then responds by sending a ranging signal to the transmitter that includes the calculated ToA. The transmitter calculates the ToA of the response signal and uses both estimated ToAs to estimate the distance between the transmitter and receiver. Note that this positioning procedure assumes that the involved V-UEs are time-synchronized (i.e., their system frame time is the same as, or is a known offset relative to, the other V-UE(s)). In addition, although FIG. 6 illustrates two V-UEs, as will be appreciated, they need not be V-UEs, and may instead be any other type of UE capable of sidelink communication.

As will be appreciated, ranging accuracy improves with the bandwidth of the ranging signals. Specifically, a higher bandwidth can better separate the different multipaths of the ranging signals.

Figure 7:
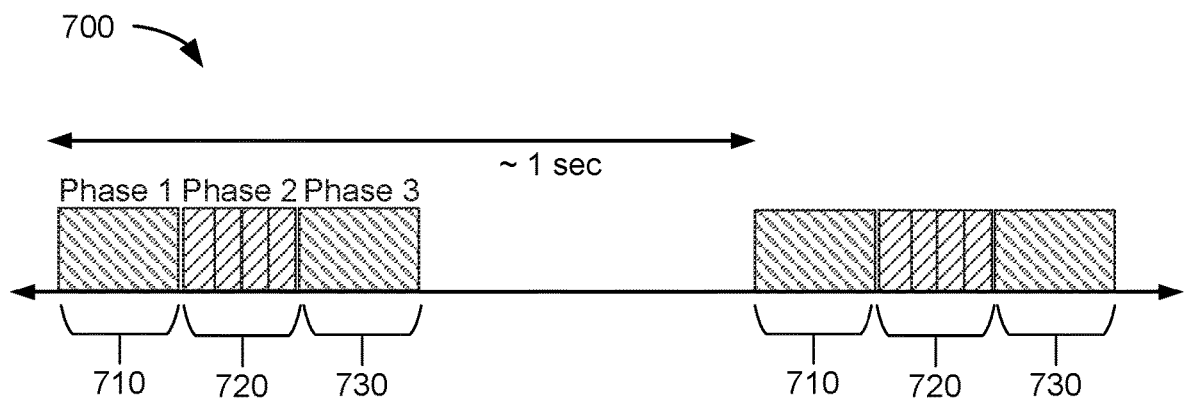
FIG. 7 is a timeline illustrating a three-phase communication protocol, according to aspects of the disclosure.

A three-phase protocol can be used for the transmission of ranging signals (e.g., SL-PRS) used for positioning. FIG. 7 is a timeline 700 illustrating the three-phase protocol, according to aspects of the disclosure. As shown in FIG. 7, the three-phase protocol occurs periodically, such as every one second. In the first phase 710, a transmitter (e.g., V-UE 604, RSU 610) broadcasts the relative location of its antenna(s) (compared to the center location of the transmitter), identifiers (IDs) of the sequences to be transmitted by the antenna(s) in the second phase 720, and the time/frequency resources on which the sequences will be transmitted in the second phase 720.

In the second phase 720, the transmitter transmits wideband sequences (e.g., SL-PRS) having the determined sequence IDs and on the determined time/frequency resources. In the third phase 730, the transmitter broadcasts its own GPS location, pseudoranges to one or more satellites, and/or orientation that it had during the second phase. It also broadcasts the ToAs from the second phase 720. That is, it broadcasts the ToAs of any SL-PRS received during the second phase 720. Note that for V2I positioning, only RSUs need to perform the third phase 730.

In an aspect, all V-UEs and RSUs may be configured (e.g., by the applicable standard) to follow this three-phase protocol. Thus, during each phase, the transmitter may also receive signals from other V-UEs/RSUs that contain the same type of information as the transmitter transmitted. In that way, both transmitters and receivers can estimate the distances between itself and other V-UEs/RSUs.

Figure 8:
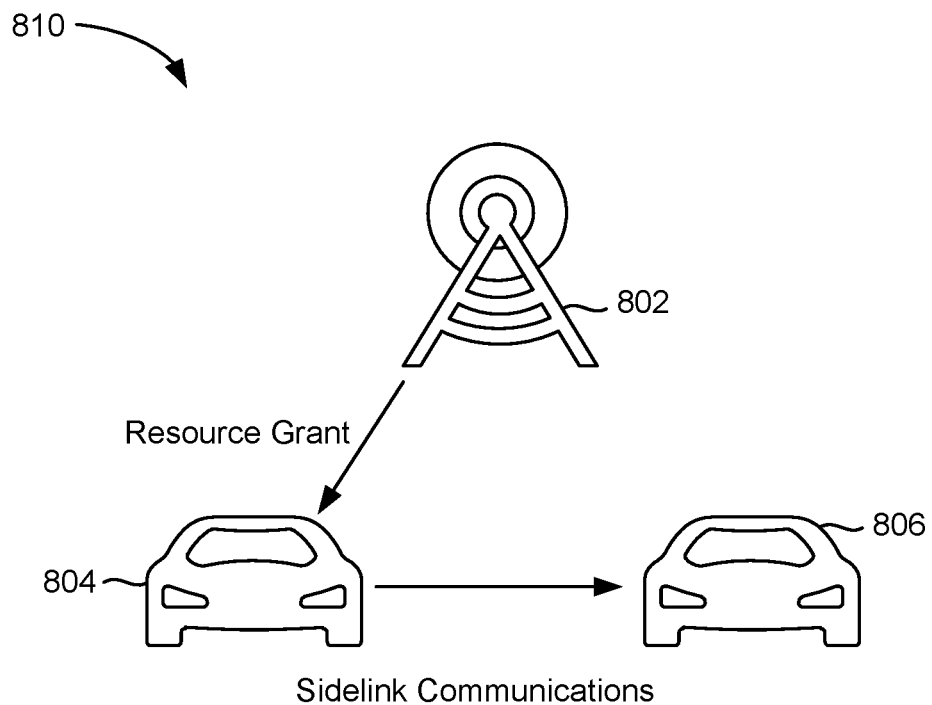
FIG. 8 illustrates the two resource allocation modes for transmissions on a sidelink, according to aspects of the disclosure.
Figure 8:
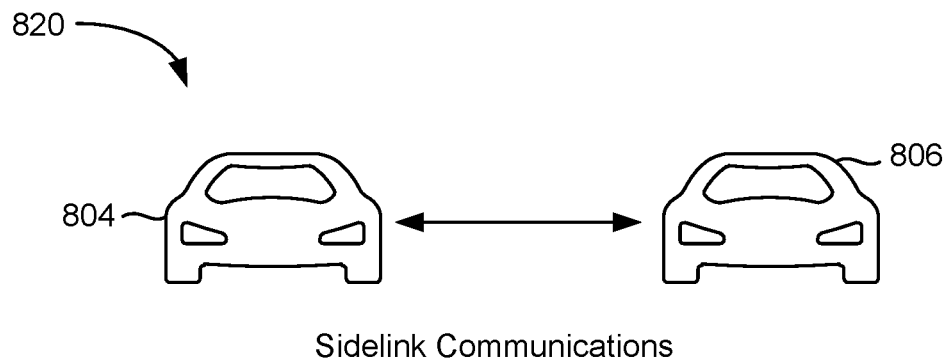

FIG. 8 illustrates the two resource allocation modes for transmissions on NR sidelinks, according to aspects of the disclosure. In the first mode 810 (labeled "Mode 1"), the base station 802 (e.g., a gNB) allocates time/frequency resources for sidelink communication between the involved V-UEs. Thus, in the example of FIG. 8, the base station 802 allocates time/frequency resources for the sidelink between V-UEs 804 and 806. The transmitter (e.g., V-UE 804) uses the allocated resources to transmit ranging signals (e.g., SL-PRS) according to the three-phase protocol described above with reference to FIG. 7. That is, the transmitter transmits the first, second, and third phase signals on the resources allocated by the base station 802. In the second mode 820 (labeled "Mode 2"), the involved UEs 804 and 806 autonomously select sidelink resources to use for transmission of the three-phase ranging signals. A V-UE can only use the first mode if it has cellular coverage, and can use the second mode regardless of whether or not it has cellular coverage. Note that although FIG. 8 illustrates two V-UEs, as will be appreciated, they need not be V-UEs, and may instead be any other type of UE capable of sidelink communication.

Signaling over the sidelink is the same between the two resource allocation modes. From the point of view of the receiver (e.g., V-UE 806), there is no difference between the modes. That is, it does not matter to the receiver whether the resources for the ranging signals were allocated by the base station 802 or the transmitter UE.

In addition, as described above with reference to FIG. 3, NR sidelinks support HARQ retransmission. In the first mode, the base station (e.g., base station 802) provides a dynamic grant for HARQ feedback or activates a configured sidelink grant. The sidelink feedback can be reported back to the base station by the transmitting UE (e.g., V-UE 804).

Each established sidelink includes a PSCCH that carries sidelink control information (SCI). First stage control (referred to as "SCI-1") is transmitted on the PSCCH and contains information for resource allocation and decoding second stage control (referred to as "SCI-2"). The second stage control is transmitted on the PSSCH and contains information for decoding the data that will be transmitted on the shared channel (SCH) of the sidelink. The first stage control information is decodable by all UEs, whereas the second stage control information may include formats that are only decodable by certain UEs. This ensures that new features can be introduced in the second stage control while maintaining resource reservation backward compatibility in the first stage control.

Figure 9:
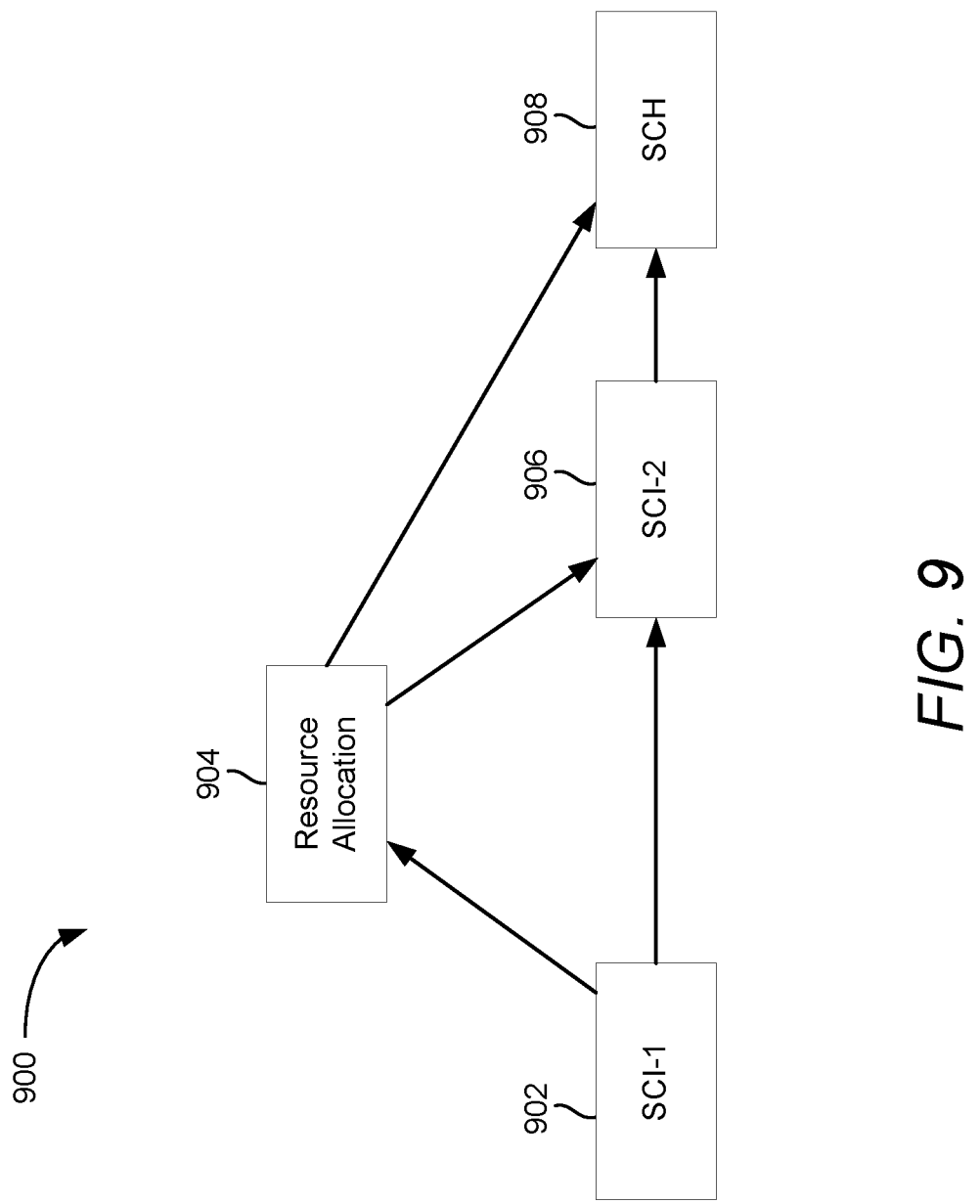
FIG. 9 is a diagram showing how a shared channel (SCH) is established on a sidelink between two or more UEs, according to aspects of the disclosure.

Both the first and second stage control use the physical downlink control channel (PDCCH) polar coding chain, illustrated in FIG. 9. FIG. 9 is a diagram 900 showing how the SCH is established on a sidelink between two or more UEs, according to aspects of the disclosure. Specifically, information in the SCI-1 902 is used for resource allocation 904 (by the network or the involved UEs) for the SCI-2 906 and SCH 908. In addition, information in the SCI-1 902 is used to determine/decode the contents of the SCI-2 906 transmitted on the allocated resources. Thus, a receiving UE needs both the resource allocation 904 and the SCI-1 902 to decode the SCI-2 906. Information in the SCI-2 906 is then used to determine/decode the SCH 908.

Figure 10:
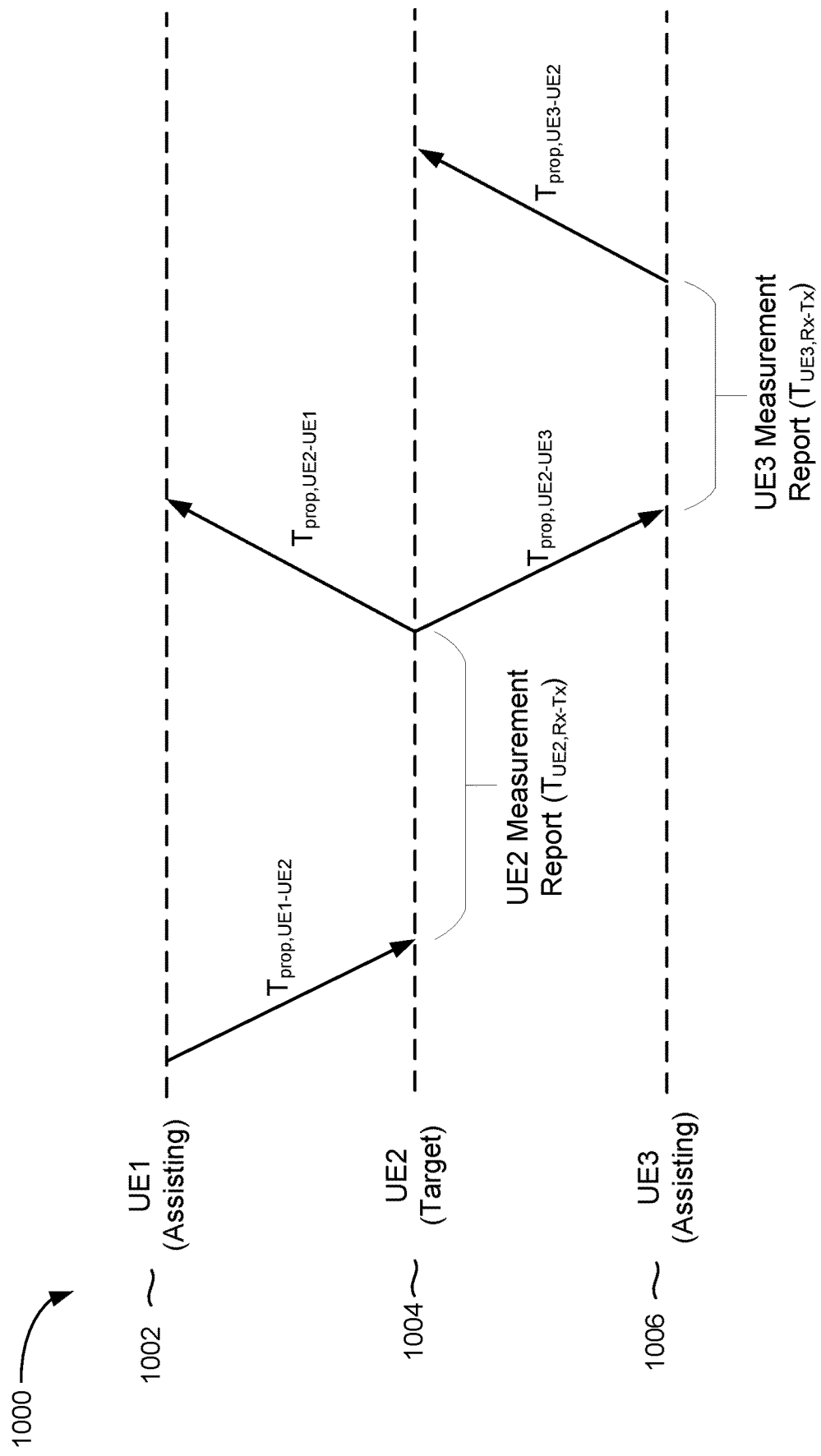
FIGS. 10 and 11 are diagrams showing example timings of round-trip-time (RTT) signals exchanged between a target UE and two assisting UEs, according to aspects of the disclosure.

A UE may use round-trip-time (RTT) positioning techniques with multiple other UEs or RSUs to determine its location based on ranging signals to/from, and the known locations of, the other involved UEs/RSUs. FIG. 10 is a diagram 1000 showing example timings of RTT signals between a target UE 1004 (labeled "UE2") and two assisting UEs 1002 (labeled "UE1") and 1006 (labeled "UE3"), according to aspects of the disclosure. The UEs 1002 to 1006 may correspond to any of the UEs described herein, and in particular, may be V-UEs. In FIG. 10, the target UE 1004 is attempting to estimate its location, and the assisting UEs 1002 and 1006 have known locations (e.g., from GPS).

In the example of FIG. 10, the target UE 1004 receives a ranging signal (e.g., SL-PRS) from the assisting UE 1002 and responds with its own ranging signal (e.g., SL-PRS). The ranging signals may be transmitted on time/frequency resources allocated by the network (e.g., a base station or a location server) or one of the involved UEs, as described above with reference to FIG. 8. This enables the receiver UE(s) to know on what frequency and at what time to measure the ranging signals. In the example of FIG. 10, the received ranging signal has some propagation time between the assisting UE 1002 and the target UE 1004, referred to as $T_{prop,UE1-UE2}$. The length of time between reception of the ranging signal from the assisting UE 1002 and the transmission of the responding ranging signal by the target UE 1004 is referred to as "$T_{UE2,Rx-Tx}$," or "UE2 Rx-Tx," where "Rx-Tx" stands for "reception-to-transmission." The response ranging signal may include a measurement report including the value of $T_{UE2,Rx-Tx}$, and has some propagation time between the target UE 1004 and the assisting UE 1002, referred to as $T_{prop,UE2-UE1}$ (which is assumed to be equal to $T_{prop,UE1-UE2}$).

The response ranging signal from the target UE 1004 may also be received by a second assisting UE 1006 after some propagation time, referred to as $T_{prop,UE2-UE3}$. Alternatively, this may be a different ranging signal transmitted by the target UE 1004 around the same time (in the example of FIG. 10) as the response ranging signal to assisting UE 1002. After some delay at the second assisting UE 1006, referred to as "$T_{UE3,Rx-Tx}$," or "UE3 Rx-Tx," the second assisting UE 1006 transmits a response ranging signal to the target UE 1004. The response ranging signal may include a measurement report including the value of $T_{UE3,Rx-Tx}$, and has some propagation time between the assisting UE 1006 and the target UE 1004, referred to as $T_{prop,UE3-UE2}$ (which is assumed to be equal to $T_{prop,UE2-UE3}$).

Based on the transmission and reception times of the ranging signals and the values of $T_{UE2,Rx-Tx}$ and $T_{UE3,Rx-Tx}$, a positioning entity (e.g., the target UE 1004) can calculate the times of flight between the target UE 1004 and the assisting UEs 1002 and 1006 (i.e., $T_{prop,UE1-UE2}$ and/or $T_{prop,UE2-UE1}$ and $T_{prop,UE2-UE3}$ and/or $T_{prop,UE3-UE2}$ in the example of FIG. 10). Based on the times of flight and the speed of light, the positioning entity can calculate the distances between the target UE 1004 and the assisting UEs 1002 and 1006. Based on these distances, the positioning entity can estimate the relative location of the target UE 1004 with respect to the assisting UEs 1002 and 1006. If the assisting UEs 1002 and 1006 have known locations (e.g., GPS coordinates received from the assisting UEs 1002 and 1006), the positioning entity can estimate the absolute location of the target UE 1004 based on the distances between the target UE 1004 and the assisting UEs 1002 and 1006 and the known locations of the assisting UEs 1002 and 1006. Where the assisting UEs 1002 and 1006 provide their locations, they may also provide an uncertainty or accuracy level associated with that location.

Figure 11:
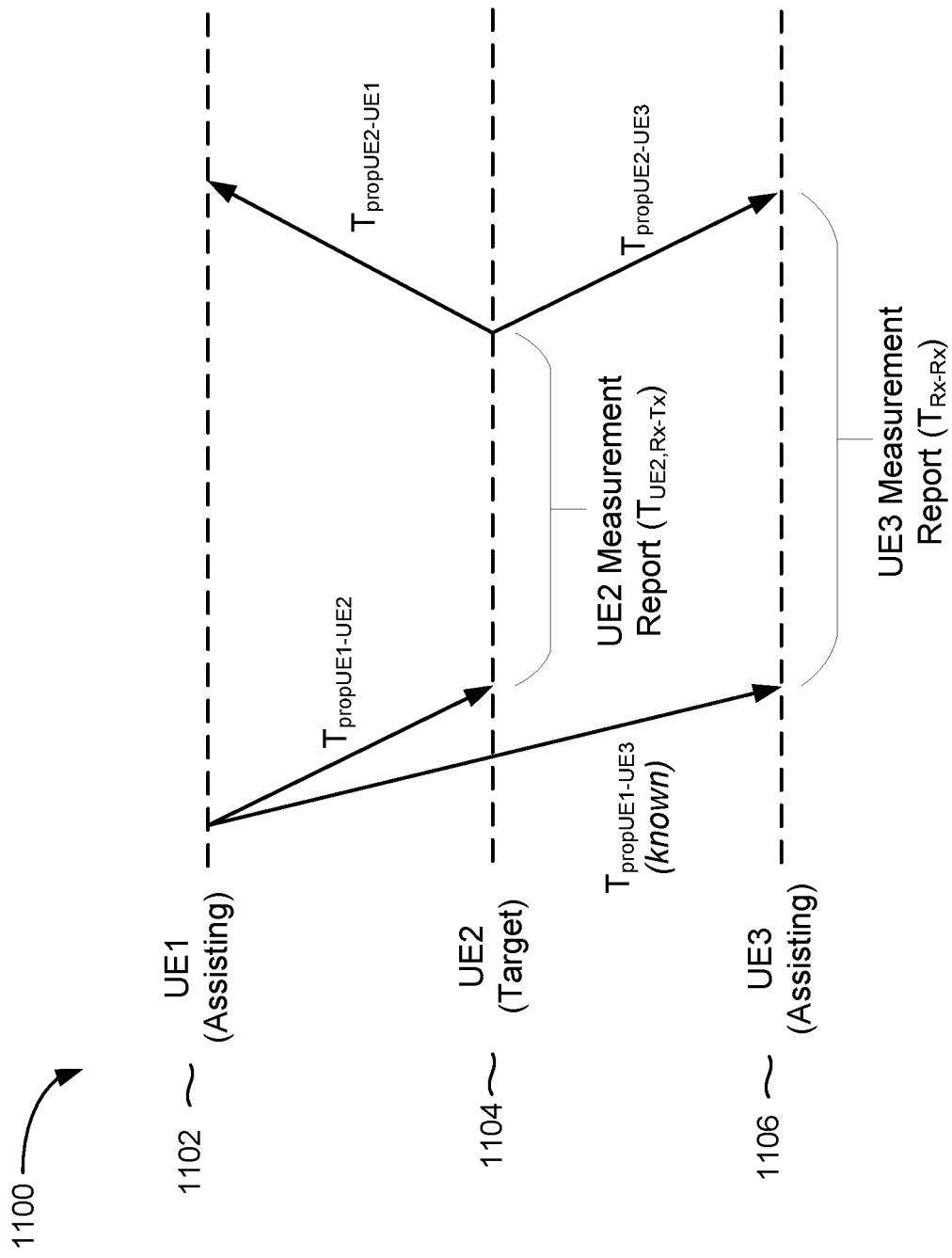

FIG. 11 is a diagram 1100 showing example timings of RTT signals exchanged between a target UE 1104 (labeled "UE2") and two assisting UEs 1102 (labeled "UE1") and 1106 (labeled "UE3"), according to aspects of the disclosure. The UEs 1102 to 1106 may correspond to any of the UEs described herein, and in particular, may be V-UEs. In FIG. 11, the target UE 1104 is attempting to estimate its location, and the assisting UEs 1102 and 1106 have known locations (e.g., from GPS).

In the example of FIG. 11, the first assisting UE 1102 transmits a ranging signal (e.g., SL-PRS) that is received at the target UE 1104 after some propagation time $T_{prop,UE1-UE2}$. The ranging signal is also received/measured at the second assisting UE 1106 after some propagation time $T_{prop,UE1-UE3}$. In the example of FIG. 11, this is a known propagation time, or can be derived, because the locations of the assisting UEs 1102 and 1106 are known.

After some UE processing time at the target UE 1104, referred to as $T_{UE2,Rx-Tx}$, the target UE 1104 transmits a response ranging signal, which, after a propagation delay $T_{prop,UE2-UE1}$, is received/measured at the first assisting UE 1102. The second assisting UE 1106 also receives/measures the response ranging signal after some propagation delay $T_{prop,UE2-UE3}$. As described above, the response ranging signal may include a measurement report including the UE processing time $T_{UE2,Rx-Tx}$ at the target UE 1104.

The second assisting UE 1106 determines the time difference between the ToA of the ranging signal transmitted by the first assisting UE 1102 and the ToA of the response ranging signal transmitted by the target UE 1104, referred to as $T_{UE-RX-UE-RX}$, or more simply, $T_{Rx-Rx}$. The second assisting UE 1106 sends a measurement report to the positioning entity (e.g., target UE 1104) reporting the $T_{UE-RX-UE-RX}$ measurement.

The distance between the second assisting UE 1106 to the target UE 1104 can then be calculated based on the following observation:

$$T_{Prop,UE1-UE2}+T_{Rx-Tx}+T_{Prop,UE2-UE3}=T_{UE\,Rx-UE\,Rx}+T_{Prop,UE1-UE3}$$

Based on these distances, the positioning entity can estimate the relative location of the target UE 1104 with respect to the assisting UEs 1102 and 1106. If the assisting UEs 1102 and 1106 have known locations (e.g., GPS coordinates received from the assisting UEs 1102 and 1106), the positioning entity can estimate the absolute location of the target UE 1104 based on the distances between the target UE 1104 and the assisting UEs 1102 and 1106 and the known locations of the assisting UEs 1102 and 1106. Where the assisting UEs 1102 and 1106 provide their locations, they may also provide an uncertainty or accuracy level associated with that location.

Note that although FIGS. 10 and 11 illustrate RTT timings between a target UE and two assisting UEs, as will be appreciated there may be more or fewer than two assisting UEs.

The present disclosure provides techniques for sidelink-assisted positioning. In a first scenario for sidelink-assisted positioning, the assisting UEs (e.g., assisting UEs 1102 and 1106) may have cellular coverage (i.e., cellular connectivity to a base station), and the target UE (e.g., target UE 1104) may not have coverage (i.e., not have cellular connectivity to a base station). Alternatively, the target UE may have coverage, but it may be very poor, such that the UE still cannot receive transmissions from the base station.

In this scenario, the target UE can initiate a location request by transmitting a request to each of any nearby (assisting) UEs over sidelinks established with those UEs. The sidelinks may be established at the time of the location request or may have been previously established for other reasons. The assisting UE(s) receive the location requests and forward them to the network (e.g., a serving base station or a location server). In response, the network assigns time/frequency resources (e.g., resource allocation 904) to each of the assisting UEs over the Uu interface for the ranging signals (e.g., SL-PRS) to be used for the respective positioning procedures. The target UE does not, however, receive this Uu link and resource allocation information. Instead, the assisting UEs send sidelink transmissions to the target UE that include the ranging signal configuration in the chosen subchannel. Specifically, the assisting UEs transmit SCI-2 that includes the ranging signal configurations received from the network. However, the assisting UEs first transmit SCI-1 that enables the target UE to decode the subsequent SCI-2, as discussed above with reference to FIG. 9. Once the target UE has the allocated ranging signal configuration to use for the positioning procedure with each assisting UE, it can transmit and receive ranging signals on those resources as discussed above with reference to FIGS. 10 and 11.

In a second scenario for sidelink-assisted positioning, none of the target UE and the assisting UEs may have cellular coverage. In this case, the target UE transmits the location request to the assisting UEs over sidelinks established with the respective assisting UEs, and the assisting UEs can select ranging signal (e.g., SL-PRS) time/frequency resources without coordinating with the network. The assisting UEs then send sidelink transmissions to the target UE that include the selected ranging signal configuration in the chosen subchannel. Specifically, unlike the first option, the assisting UEs transmit SCI-2 that includes the ranging signal configurations selected without network involvement. In addition, the assisting UEs first transmit SCI-1 that enables the target UE to decode the subsequent SCI-2, as discussed above with reference to FIG. 9. Once the target UE has the allocated ranging signal configuration to use for the positioning procedure with each assisting UE, it can transmit and receive ranging signals on those resources as discussed above with reference to FIGS. 10 and 11.

Referring to the second scenario in greater detail, when an assisting UE that does not have coverage responds to a location request from a target UE, the assisting UE has to select the time/frequency resources (e.g., REs) on which to transmit SL-PRS back to the target UE. Since multiple UEs assisting in the positioning session with the target UE may not have coverage, the SL-PRS resources chosen by one assisting UE may collide with the SL-PRS resources chosen by another assisting UE.

Accordingly, the present disclosure provides techniques for avoiding "PRS collisions." In an aspect, an assisting UE chooses SL-PRS resources based on a deterministic function of various parameters (described below) derived relative to either the time/frequency resources carrying the SCI-1/SCI-2 that contains the assisting UE's response to a location request, or the time/frequency resources of the PSCCH and/or the PSSCH that included the location request.

In the time domain, the time resources (e.g., symbols, slots, subframes, repetitions, etc.) assigned to SL-PRS transmissions may be derived based on a common/deterministic function. As a first option, the time domain resources for SL-PRS transmissions may be derived based on a deterministic function of the subchannel of the PSCCH or PSSCH associated with the location request. One PSCCH can schedule multiple PSSCHs. Thus, in an aspect, if the PSCCH is associated with multiple PSSCHs, the assisting UE can select the index of the PSSCH having the smallest or largest index value, for example, to derive the time domain resources for the SL-PRS.

As a second option, the time domain resources for SL-PRS transmissions may be derived based on a deterministic function of the source ID of the target UE that transmitted the location request. This option would be beneficial in the following example scenario. Specifically, a responding UE may need to transmit SL-PRS resources that are tailored to the specific target UE. For example, the transmit beam and/or pathloss may be specific to the target UE, and therefore, for different target UEs, different SL-PRS resources would need to be transmitted. However, if two different UEs happen to send location requests in the same slot/subchannel, and the source ID is not part of the determination procedure to determine the time domain resources for the SL-PRS, then the responding UE would not be able to transmit two SL-PRS resources tailored toward different UEs. Instead, the responding UE would select SL-PRS resources for both target UEs based on the slot/subchannel associated with the location request (the first option), but since in this scenario the slot/subchannel is the same for both UEs, the selected PRS resources would be the same for both target UEs. As such, it would be beneficial for the PRS resources to be derived based on both the slot/subchannel and the source ID.

As a third option, the time domain resources for PRS transmissions may be derived based on a deterministic function of the destination ID of the PSCCH associated with the location request. This destination ID may indicate that the location request is a unicast (i.e., targeted to a particular assisting UE), a groupcast (i.e., targeted to a specific group of UEs), or a broadcast (i.e., targeted to any listening UEs). Making the time domain resources for SL-PRS a function of the destination ID would allow a responding UE to send multiple SL-PRS (even to the same target UE that participates in multiple groups). As such, this factor could make the SL-PRS transmission group-specific.

As a fourth option, the time domain resources for SL-PRS transmissions may be derived based on a deterministic function of a pseudo-random variable and/or a scrambling seed. In this case, a configured scrambling seed could be used that is configured in both the target and assisting UEs from higher layers (e.g., Layer 2, Layer 3, or Application Layer). This could provide additional randomization of the time domain resources used for the SL-PRS transmissions.

As a fifth option, the time domain resources for SL-PRS transmissions may be derived based on a deterministic function of a combination of the above. In this case, which of the above-described factors are used and the deterministic function may be configured by a higher layer (e.g., Layer 2, Layer 3, or Application Layer). Alternatively, it can be band or frequency range (e.g., FR1 versus FR2) related. For example, the source ID (second option) is important for FR2, as it enables the responding UE to correctly form a transmit beam for the target UE.

With regard to selecting the frequency resources for SL-PRS transmissions, there are several options. As a first option, the SCI-2 may contain additional frequency domain allocation fields (e.g., subband IDs, start/end PRBs, etc.) that are dedicated for signaling the frequency domain resources for the SL-PRS. As a second option, the frequency domain allocation fields of the SCI-2 (which are typically used for scheduling the PSSCH) may instead be used to schedule only SL-PRS. In this case, no PSSCH can be scheduled. As a third option, additional frequency domain allocation fields may be added in the SCI-2 that provide the PRS allocation in a differential/relative manner with respect to the frequency domain allocation fields of the PSSCH. For example, if the PSSCH is in a set of subbands, the SL-PRS could be transmitted in the same subbands of the PSSCH plus one more below and/or above, as illustrated in FIG. 12.

Figure 12:
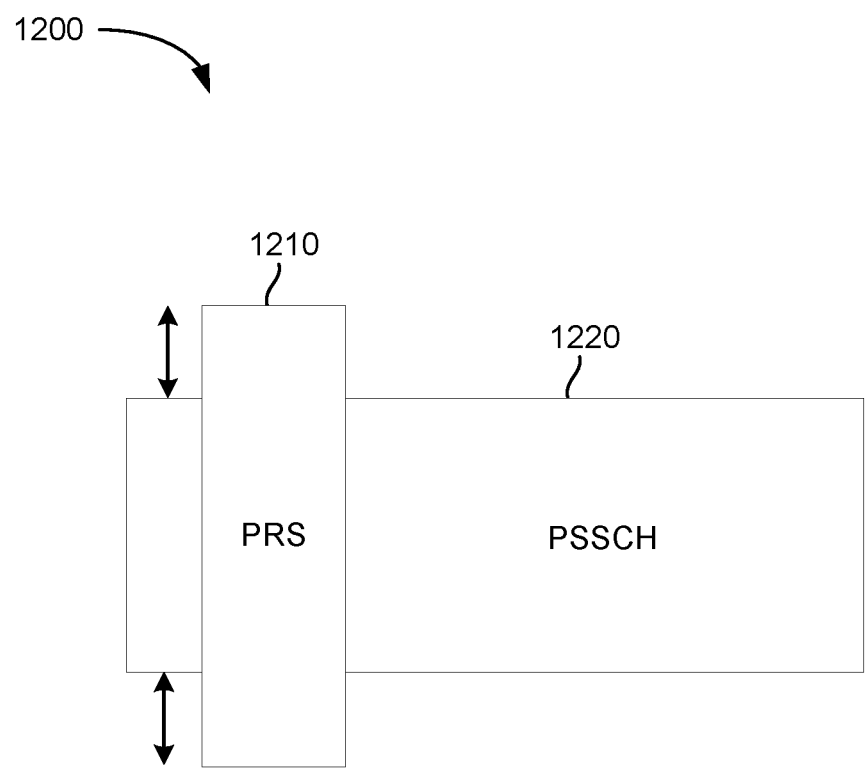
FIG. 12 is a diagram showing the relative time and frequency relationship between example physical sidelink shared channel (PSSCH) resources and example positioning reference signal (PRS) resources, according to aspects of the disclosure.

FIG. 12 is a diagram 1200 showing the relative time and frequency relationship between example PSSCH resources 1220 and example PRS resources 1210, according to aspects of the disclosure. The PRS resources 1210 may be SL-PRS resources. As can be seen, the PRS resources 1210 are transmitted in the same subbands as the PSSCH resource 1220, plus at least one subband below and above the PSSCH resource 1220.

Figure 13:
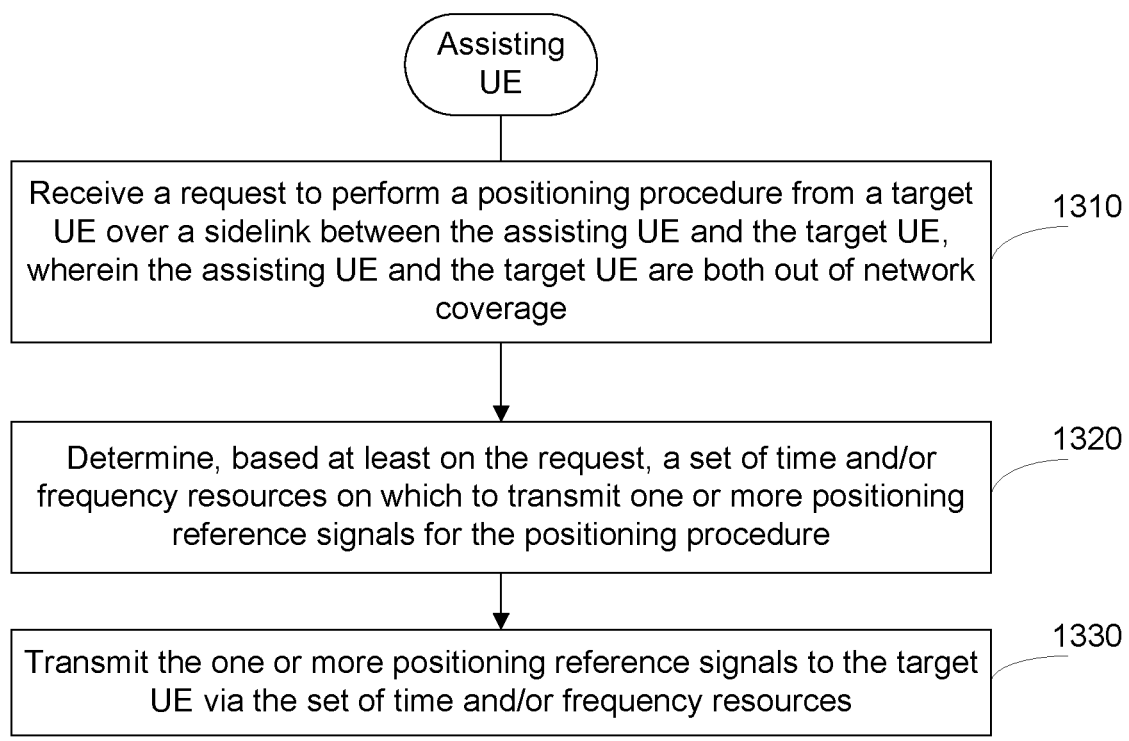
FIGS. 13 and 14 illustrate example methods for wireless communication, according to aspects of the disclosure.

FIG. 13 illustrates an example method 1300 for wireless communication, according to aspects of the disclosure. In an aspect, the method 1300 may be performed by an assisting UE (e.g., any of the UEs described herein). As a specific example, the assisting UE may correspond to UE 1102, UE 1106, UE 1202, or UE 1206.

At 1310, the assisting UE receives a request to perform a positioning procedure (e.g., RTT) from a target UE (e.g., any of the UEs described herein) over a sidelink between the assisting UE and the target UE. As a specific example, the target UE may correspond to UE 1104 or UE 1204. In an aspect, the assisting UE and the target UE are both out of network coverage (i.e., do not have cellular/network coverage, as in, e.g., Mode 2 of FIG. 8). In an aspect, operation 1310 may be performed by transceiver 404, processing system 410, memory 414, and/or sidelink manager 470, any or all of which may be considered means for performing this operation.

At 1320, the assisting UE determines, based at least on the request, a set of time and/or frequency resources on which to transmit one or more positioning reference signals for the positioning procedure. In an aspect, operation 1320 may be performed by transceiver 404, processing system 410, memory 414, and/or sidelink manager 470, any or all of which may be considered means for performing this operation.

At 1330, the assisting UE transmits the one or more positioning reference signals to the target UE via the set of time and/or frequency resources. In an aspect, operation 1330 may be performed by transceiver 404, processing system 410, memory 414, and/or sidelink manager 470, any or all of which may be considered means for performing this operation.

Figure 14:
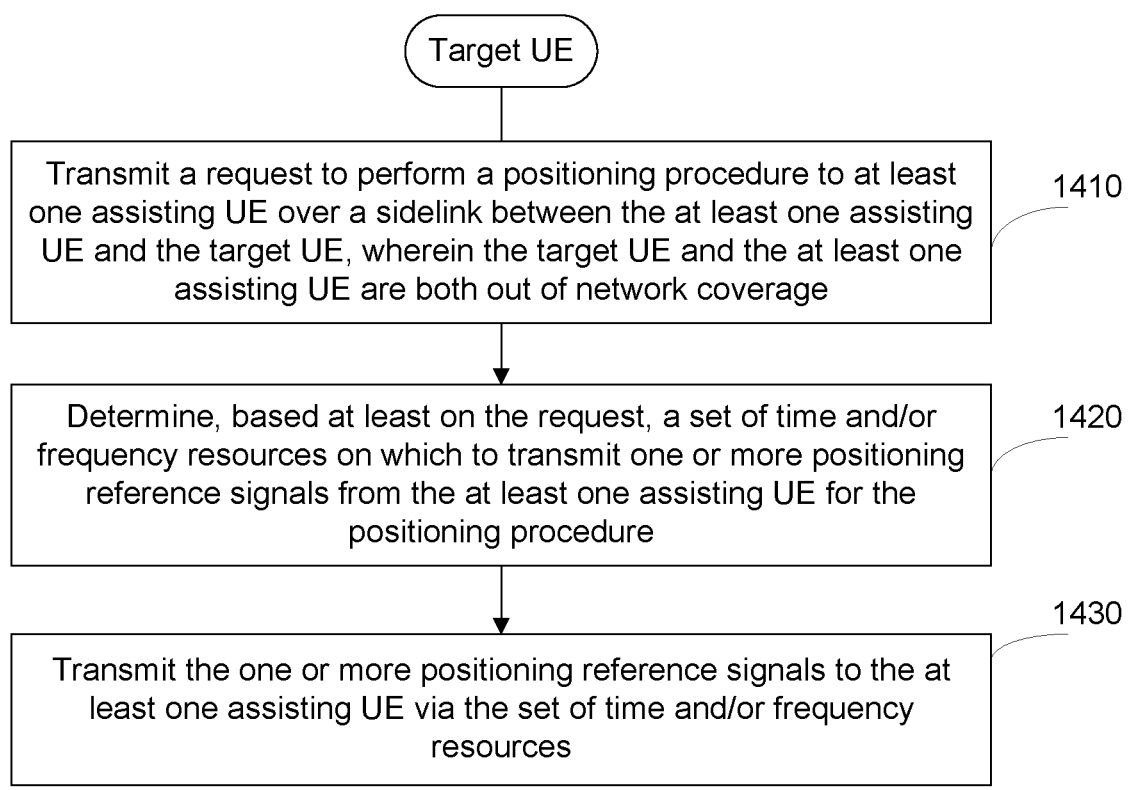

FIG. 14 illustrates an example method 1400 for wireless communication, according to aspects of the disclosure. In an aspect, the method 1400 may be performed by a target UE (e.g., any of the UEs described herein). As a specific example, the target UE may correspond to UE 1104 or UE 1204.

At 1410, the target UE transmits a request to perform a positioning procedure (e.g., RTT) to at least one assisting UE (e.g., any of the UEs described herein) over a sidelink between the at least one assisting UE and the target UE. As a specific example, the at least one assisting UE may correspond to UE 1102, UE 1106, UE 1202, or UE 1206. In an aspect, the target UE and the at least one assisting UE are both out of network coverage (i.e., do not have cellular/network coverage, as in, e.g., Mode 2 of FIG. 8). In an aspect, operation 1410 may be performed by transceiver 404, processing system 410, memory 414, and/or sidelink manager 470, any or all of which may be considered means for performing this operation.

At 1420, the target UE determines, based at least on the request, a set of time and/or frequency resources on which to transmit one or more positioning reference signals from the at least one assisting UE for the positioning procedure. In an aspect, operation 1420 may be performed by transceiver 404, processing system 410, memory 414, and/or sidelink manager 470, any or all of which may be considered means for performing this operation.

At 1430, the target UE transmits the one or more positioning reference signals to the at least one assisting UE via the set of time and/or frequency resources. In an aspect, operation 1430 may be performed by transceiver 404, processing system 410, memory 414, and/or sidelink manager 470, any or all of which may be considered means for performing this operation.

As will be appreciated, a technical advantage of the methods 1300 and 1400 is the coordination of positioning reference signals transmitted over a sidelink, with reduced, even eliminated, collisions among such positioning reference signals.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method for wireless communication performed at an assisting user equipment (UE), comprising: receiving a request to perform a positioning procedure from a target UE over a sidelink between the assisting UE and the target UE; determining a set of time and/or frequency resources on which to transmit one or more positioning reference signals for the positioning procedure; transmitting, over the sidelink, an indication of the set of time and/or frequency resources to the target UE; and transmitting the one or more positioning reference signals on the set of time and/or frequency resources.

Clause 2. The method of clause 1, wherein the assisting UE determines the set of time and/or frequency resources based on a deterministic function of one or more parameters.

Clause 3. The method of clause 2, wherein the one or more parameters are derived relative to time and/or frequency resources over which the indication of the set of time and/or frequency resources to the target UE is transmitted.

Clause 4. The method of clause 3, wherein the indication of the set of time and/or frequency resources is transmitted to the target UE in a first sidelink control information (SCI-1) message and/or a second sidelink control information (SCI-2) message.

Clause 5. The method of clause 2, wherein the one or more parameters are derived relative to time and/or frequency resources over which the request to perform the positioning procedure is received.

Clause 6. The method of clause 5, wherein the request to perform the positioning procedure is received over a physical sidelink control channel (PSCCH) and/or a physical sidelink shared channel (PSSCH) of the sidelink.

Clause 7. The method of any of clauses 2 to 6, wherein the one or more parameters are used to determine time domain resources of the set of time and/or frequency resources.

Clause 8. The method of clause 7, wherein one of the one or more parameters comprises a subchannel of a PSCCH or PSSCH on which the request to perform the positioning procedure was received.

Clause 9. The method of any of clauses 7 to 8, wherein one of the one or more parameters comprises a source identifier of the target UE.

Clause 10. The method of any of clauses 7 to 9, wherein one of the one or more parameters comprises a destination identifier of a PSCCH on which the request to perform the positioning procedure was received.

Clause 11. The method of clause 10, wherein the destination identifier is associated with a unicast, a groupcast, or a broadcast.

Clause 12. The method of any of clauses 7 to 11, wherein one of the one or more parameters comprises a pseudo-random variable or a scrambling seed.

Clause 13. The method of clause 12, wherein the pseudo-random variable or the scrambling seed is configured by a higher layer of the assisting UE.

Clause 14. The method of any of clauses 7 to 13, wherein selection of the one of the one or more parameters is configured by a higher layer of the assisting UE.

Clause 15. The method of any of clauses 1 to 14, wherein the request to perform the positioning procedure includes one or more frequency domain allocation fields dedicated for signaling frequency domain resources of the set of time and/or frequency resources.

Clause 16. The method of clause 15, wherein the request to perform the positioning procedure is received over the sidelink in an SCI-2.

Clause 17. The method of any of clauses 1 to 16, wherein frequency domain allocation fields in the request to perform the positioning procedure are used only to schedule frequency domain resources of the set of time and/or frequency resources for the one or more positioning reference signals.

Clause 18. The method of any of clauses 1 to 16, wherein additional frequency domain allocation fields in the request to perform the positioning procedure are used to schedule frequency domain resources of the set of time and/or frequency resources for the one or more positioning reference signals.

Clause 19. The method of any of clauses 1 to 18, wherein the positioning procedure comprises a round-trip-time (RTT) positioning procedure.

Clause 20. An apparatus comprising a memory and at least one processor communicatively coupled to the memory, the memory and the at least one processor configured to perform a method according to any of clauses 1 to 19.

Clause 21. An apparatus comprising means for performing a method according to any of clauses 1 to 19.

Clause 22. A non-transitory computer-readable medium storing computer-executable instructions, the computer-executable comprising at least one instruction for causing a computer or processor to perform a method according to any of clauses 1 to 19.

Additional implementation examples are described in the following numbered clauses:

Clause 1. A method for wireless communication performed at an assisting user equipment (UE), comprising: receiving a request to perform a positioning procedure from a target UE over a sidelink between the assisting UE and the target UE, wherein the assisting UE and the target UE are both out of network coverage; determining, based at least on the request, a set of time and/or frequency resources on which to transmit one or more positioning reference signals for the positioning procedure; and transmitting the one or more positioning reference signals to the target UE via the set of time and/or frequency resources.

Clause 2. The method of clause 1, wherein the assisting UE determines the set of time and/or frequency resources based on a deterministic function of one or more parameters.

Clause 3. The method of clause 2, further comprising: transmitting, via the sidelink, an indication of the set of time and/or frequency resources to the target UE.

Clause 4. The method of clause 3, further comprising: deriving the one or more parameters relative to time and/or frequency resources over which the indication of the set of time and/or frequency resources is transmitted to the target UE.

Clause 5. The method of clause 4, further comprising: transmitting the indication of the set of time and/or frequency resources to the target UE in a first sidelink control information (SCI-1) message and/or a second sidelink control information (SCI-2) message.

Clause 6. The method of any of clauses 2 to 5, further comprising: deriving the one or more parameters relative to time and/or frequency resources over which the request to perform the positioning procedure is received.

Clause 7. The method of any of clauses 2 to 6, further comprising: determining time domain resources of the set of time and/or frequency resources based on the one or more parameters.

Clause 8. The method of any of clauses 2 to 7, wherein one of the one or more parameters comprises a subchannel of a PSCCH or PSSCH on which the request to perform the positioning procedure was received.

Clause 9. The method of any of clauses 2 to 8, wherein one of the one or more parameters comprises a source identifier of the target UE.

Clause 10. The method of any of clauses 2 to 9, wherein one of the one or more parameters comprises a destination identifier of a PSCCH on which the request to perform the positioning procedure was received.

Clause 11. The method of clause 10, wherein the destination identifier is associated with a unicast, a groupcast, or a broadcast.

Clause 12. The method of any of clauses 2 to 11, wherein one of the one or more parameters comprises a pseudo-random variable or a scrambling seed.

Clause 13. The method of clause 12, wherein the pseudo-random variable or the scrambling seed is configured by a higher layer of the assisting UE.

Clause 14. The method of any of clauses 2 to 13, wherein selection of the one of the one or more parameters is configured by a higher layer of the assisting UE.

Clause 15. The method of any of clauses 1 to 14, wherein the request to perform the positioning procedure includes one or more frequency domain allocation fields dedicated for signaling frequency domain resources of the set of time and/or frequency resources.

Clause 16. The method of clause 15, wherein the request to perform the positioning procedure is received via the sidelink in an SCI-2.

Clause 17. The method of any of clauses 1 to 16, wherein frequency domain allocation fields of a sidelink control information (SCI) channel associated with the request to perform the positioning procedure are used only to schedule frequency domain resources of the set of time and/or frequency resources for the one or more positioning reference signals.

Clause 18. The method of any of clauses 1 to 17, wherein: a first set of frequency domain allocation fields of an SCI channel associated with the request to perform the positioning procedure is used to schedule data, and a second set of frequency domain allocation fields of the SCI channel associated with the request to perform the positioning procedure is used to schedule frequency domain resources of the set of time and/or frequency resources for the one or more positioning reference signals.

Clause 19. The method of clause 18, wherein the second set of frequency domain allocation fields provide scheduling for the one or more positioning reference signals in a differential manner with respect to scheduling of the data by the first set of frequency domain allocation fields.

Clause 20. The method of any of clauses 1 to 19, wherein the request to perform the positioning procedure is received over a physical sidelink control channel (PSCCH) and/or a physical sidelink shared channel (PSSCH) of the sidelink.

Clause 21. The method of any of clauses 1 to 20, wherein the positioning procedure comprises a round-trip-time (RTT) positioning procedure.

Clause 22. A method for wireless communication performed at a target user equipment (UE), comprising: transmitting a request to perform a positioning procedure to at least one assisting UE over a sidelink between the at least one assisting UE and the target UE, wherein the target UE and the at least one assisting UE are both out of network coverage; determining, based at least on the request, a set of time and/or frequency resources on which to transmit one or more positioning reference signals from the at least one assisting UE for the positioning procedure; and transmitting the one or more positioning reference signals to the at least one assisting UE via the set of time and/or frequency resources.

Clause 23. The method of clause 22, wherein the target UE determines the set of time and/or frequency resources based on a deterministic function of one or more parameters.

Clause 24. The method of clause 23, further comprising: transmitting, via the sidelink, an indication of the set of time and/or frequency resources to the at least one assisting UE.

Clause 25. The method of clause 24, further comprising: deriving the one or more parameters relative to time and/or frequency resources over which the indication of the set of time and/or frequency resources is transmitted to the at least one assisting UE.

Clause 26. The method of clause 25, further comprising: transmitting the indication of the set of time and/or frequency resources to the at least one assisting UE in a first sidelink control information (SCI-1) message and/or a second sidelink control information (SCI-2) message.

Clause 27. The method of any of clauses 23 to 26, further comprising: deriving the one or more parameters relative to time and/or frequency resources over which the request to perform the positioning procedure was transmitted.

Clause 28. The method of any of clauses 23 to 27, further comprising: determining time domain resources of the set of time and/or frequency resources based on the one or more parameters.

Clause 29. The method of any of clauses 23 to 28, wherein one of the one or more parameters comprises a subchannel of a PSCCH or PSSCH on which the request to perform the positioning procedure was transmitted.

Clause 30. The method of any of clauses 23 to 29, wherein one of the one or more parameters comprises a source identifier of the target UE.

Clause 31. The method of any of clauses 23 to 30, wherein one of the one or more parameters comprises a destination identifier of a PSCCH on which the request to perform the positioning procedure was transmitted.

Clause 32. The method of clause 31, wherein the destination identifier is associated with a unicast, a groupcast, or a broadcast.

Clause 33. The method of any of clauses 23 to 32, wherein one of the one or more parameters comprises a pseudo-random variable or a scrambling seed.

Clause 34. The method of clause 33, wherein the pseudo-random variable or the scrambling seed is configured by a higher layer of the target UE.

Clause 35. The method of any of clauses 23 to 34, wherein selection of the one of the one or more parameters is configured by a higher layer of the target UE.

Clause 36. The method of any of clauses 22 to 35, wherein the request to perform the positioning procedure includes one or more frequency domain allocation fields dedicated for signaling frequency domain resources of the set of time and/or frequency resources.

Clause 37. The method of clause 36, wherein the request to perform the positioning procedure is transmitted via the sidelink in an SCI-2.

Clause 38. The method of any of clauses 22 to 37, wherein frequency domain allocation fields of a sidelink control information (SCI) channel associated with the request to perform the positioning procedure are used only to schedule frequency domain resources of the set of time and/or frequency resources for the one or more positioning reference signals.

Clause 39. The method of any of clauses 22 to 38, wherein: a first set of frequency domain allocation fields of an SCI channel associated with the request to perform the positioning procedure is used to schedule data, and a second set of frequency domain allocation fields of the SCI channel associated with the request to perform the positioning procedure is used to schedule frequency domain resources of the set of time and/or frequency resources for the one or more positioning reference signals.

Clause 40. The method of clause 39, wherein the second set of frequency domain allocation fields provide scheduling for the one or more positioning reference signals in a differential manner with respect to scheduling of the data by the first set of frequency domain allocation fields.

Clause 41. The method of any of clauses 22 to 40, further comprising: transmitting the request to perform the positioning procedure over a physical sidelink control channel (PSCCH) and/or a physical sidelink shared channel (PSSCH) of the sidelink.

Clause 42. The method of any of clauses 22 to 41, wherein the positioning procedure comprises a round-trip-time (RTT) positioning procedure.

Clause 43. An apparatus comprising a memory and at least one processor communicatively coupled to the memory, the memory and the at least one processor configured to perform a method according to any of clauses 1 to 42.

Clause 44. An apparatus comprising means for performing a method according to any of clauses 1 to 42.

Clause 45. A non-transitory computer-readable medium storing computer-executable instructions, the computer-executable comprising at least one instruction for causing a computer or processor to perform a method according to any of clauses 1 to 42.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for wireless communication performed at an assisting user equipment (UE), comprising:
    receiving a request to perform a positioning procedure from a target UE over a sidelink between the assisting UE and the target UE, wherein the assisting UE and the target UE are both out of network coverage;
    determining, based at least on the request, a set of time resources, frequency resources, or both on which to transmit one or more positioning reference signals for the positioning procedure, wherein the set of time resources, frequency resources, or both is determined based on a deterministic function of one or more parameters; and
    transmitting the one or more positioning reference signals to the target UE via the set of time resources, frequency resources, or both.

2. The method of claim 1, further comprising:
    transmitting, via the sidelink, an indication of the set of time resources, frequency resources, or both to the target UE.

3. The method of claim 2, further comprising:
deriving, before the indication of the set of time resources, frequency resources, or both is transmitted to the target UE, the one or more parameters relative to time resources, frequency resources, or both over which the indication of the set of time resources, frequency resources, or both will be transmitted to the target UE.

4. The method of claim 3, further comprising:
transmitting the indication of the set of time resources, frequency resources, or both to the target UE in a first sidelink control information (SCI-1) message, a second sidelink control information (SCI-2) message, or both.

5. The method of claim 1, further comprising:
deriving the one or more parameters relative to time resources, frequency resources, or both over which the request to perform the positioning procedure is received.

6. The method of claim 1, further comprising:
determining time domain resources of the set of time resources, frequency resources, or both based on the one or more parameters.

7. The method of claim 1, wherein one of the one or more parameters comprises a subchannel of a physical sidelink control channel (PSCCH) or physical sidelink shared channel (PSSCH) on which the request to perform the positioning procedure is received.

8. The method of claim 1, wherein one of the one or more parameters comprises a source identifier of the target UE.

9. The method of claim 1, wherein one of the one or more parameters comprises a destination identifier of a PSCCH on which the request to perform the positioning procedure is received.

10. The method of claim 9, wherein the destination identifier is associated with a unicast, a groupcast, or a broadcast.

11. The method of claim 1, wherein one of the one or more parameters comprises a pseudo-random variable or a scrambling seed.

12. The method of claim 11, wherein the pseudo-random variable or the scrambling seed is configured by a higher layer of the assisting UE.

13. The method of claim 1, wherein selection of the one of the one or more parameters is configured by a higher layer of the assisting UE.

14. The method of claim 1, wherein the request to perform the positioning procedure includes one or more frequency domain allocation fields dedicated for signaling frequency domain resources of the set of time resources, frequency resources, or both.

15. The method of claim 14, wherein the request to perform the positioning procedure is received via the sidelink in an SCI-2 message.

16. The method of claim 1, wherein frequency domain allocation fields of a sidelink control information (SCI) channel associated with the request to perform the positioning procedure are used only to schedule frequency domain resources of the set of time resources, frequency resources, or both for the one or more positioning reference signals.

17. The method of claim 1, wherein:
a first set of frequency domain allocation fields of an SCI channel associated with the request to perform the positioning procedure is used to schedule data, and
a second set of frequency domain allocation fields of the SCI channel associated with the request to perform the positioning procedure is used to schedule frequency domain resources of the set of time resources, frequency resources, or both for the one or more positioning reference signals.

18. The method of claim 17, wherein the second set of frequency domain allocation fields provide scheduling for the one or more positioning reference signals in a differential manner with respect to scheduling of the data by the first set of frequency domain allocation fields.

19. The method of claim 1, wherein the request to perform the positioning procedure is received over a physical sidelink control channel (PSCCH), a physical sidelink shared channel (PSSCH), or both of the sidelink.

20. The method of claim 1, wherein the positioning procedure comprises a round-trip-time (RTT) positioning procedure.

21. A method for wireless communication performed at a target user equipment (UE), comprising:
transmitting a request to perform a positioning procedure to at least one assisting UE over a sidelink between the at least one assisting UE and the target UE, wherein the target UE and the at least one assisting UE are both out of network coverage;
determining, based at least on the request, a set of time resources, frequency resources, or both on which to transmit one or more positioning reference signals to the at least one assisting UE for the positioning procedure, wherein the set of time resources, frequency resources, or both is determined based on a deterministic function of one or more parameters; and
transmitting the one or more positioning reference signals to the at least one assisting UE via the set of time resources, frequency resources, or both.

22. The method of claim 21, further comprising:
transmitting, via the sidelink, an indication of the set of time resources, frequency resources, or both to the at least one assisting UE.

23. The method of claim 22, further comprising:
deriving, before the indication of the set of time resources, frequency resources, or both is transmitted to the at least one assisting UE, the one or more parameters relative to time resources, frequency resources, or both over which the indication of the set of time resources, frequency resources, or both will be transmitted to the at least one assisting UE.

24. The method of claim 23, further comprising:
transmitting the indication of the set of time resources, frequency resources, or both to the at least one assisting UE in a first sidelink control information (SCI-1) message, a second sidelink control information (SCI-2) message, or both.

25. The method of claim 21, further comprising:
deriving the one or more parameters relative to time resources, frequency resources, or both over which the request to perform the positioning procedure is transmitted.

26. The method of claim 21, further comprising:
determining time domain resources of the set of time resources, frequency resources, or both based on the one or more parameters.

27. The method of claim 21, wherein one of the one or more parameters comprises a subchannel of a PSCCH or PSSCH on which the request to perform the positioning procedure is transmitted.

28. The method of claim 21, wherein one of the one or more parameters comprises a source identifier of the target UE.

29. The method of claim 21, wherein one of the one or more parameters comprises a destination identifier of a PSCCH on which the request to perform the positioning procedure is transmitted.

30. The method of claim 29, wherein the destination identifier is associated with a unicast, a groupcast, or a broadcast.

31. The method of claim 21, wherein one of the one or more parameters comprises a pseudo-random variable or a scrambling seed.

32. The method of claim 31, wherein the pseudo-random variable or the scrambling seed is configured by a higher layer of the target UE.

33. The method of claim 21, wherein selection of the one of the one or more parameters is configured by a higher layer of the target UE.

34. The method of claim 21, wherein the request to perform the positioning procedure includes one or more frequency domain allocation fields dedicated for signaling frequency domain resources of the set of time resources, frequency resources, or both.

35. The method of claim 34, wherein the request to perform the positioning procedure is transmitted via the sidelink in an SCI-2 message.

36. The method of claim 21, wherein frequency domain allocation fields of a sidelink control information (SCI) channel associated with the request to perform the positioning procedure are used only to schedule frequency domain resources of the set of time resources, frequency resources, or both for the one or more positioning reference signals.

37. The method of claim 21, wherein:
a first set of frequency domain allocation fields of an SCI channel associated with the request to perform the positioning procedure is used to schedule data, and
a second set of frequency domain allocation fields of the SCI channel associated with the request to perform the positioning procedure is used to schedule frequency domain resources of the set of time resources, frequency resources, or both for the one or more positioning reference signals.

38. The method of claim 37, wherein the second set of frequency domain allocation fields provide scheduling for the one or more positioning reference signals in a differential manner with respect to scheduling of the data by the first set of frequency domain allocation fields.

39. The method of claim 21, further comprising:
transmitting the request to perform the positioning procedure over a physical sidelink control channel (PSCCH), a physical sidelink shared channel (PSSCH), or both of the sidelink.

40. The method of claim 21, wherein the positioning procedure comprises a round-trip-time (RTT) positioning procedure.

41. An assisting user equipment (UE), comprising:
a memory;
at least one transceiver; and
at least one processor communicatively coupled to the memory and the at least one transceiver, the at least one processor configured to:
receive a request to perform a positioning procedure from a target UE over a sidelink between the assisting UE and the target UE, wherein the assisting UE and the target UE are both out of network coverage;
determine, based at least on the request, a set of time resources, frequency resources, or both on which to transmit one or more positioning reference signals for the positioning procedure, wherein the set of time resources, frequency resources, or both is determined based on a deterministic function of one or more parameters; and
cause the at least one transceiver to transmit the one or more positioning reference signals to the target UE via the set of time resources, frequency resources, or both.

42. The assisting UE of claim 41, wherein the at least one processor is further configured to:
cause the at least one transceiver to transmit, via the sidelink, an indication of the set of time resources, frequency resources, or both to the target UE.

43. The assisting UE of claim 42, wherein the at least one processor is further configured to:
derive, before the indication of the set of time resources, frequency resources, or both is transmitted to the target UE, the one or more parameters relative to time resources, frequency resources, or both over which the indication of the set of time resources, frequency resources, or both will be transmitted to the target UE.

44. The assisting UE of claim 43, wherein the at least one processor is further configured to:
cause the at least one transceiver to transmit the indication of the set of time resources, frequency resources, or both to the target UE in a first sidelink control information (SCI-1) message, a second sidelink control information (SCI-2) message, or both.

45. The assisting UE of claim 41, wherein the at least one processor is further configured to:
derive the one or more parameters relative to time resources, frequency resources, or both over which the request to perform the positioning procedure is received.

46. The assisting UE of claim 41, wherein the at least one processor is further configured to:
determine time domain resources of the set of time resources, frequency resources, or both based on the one or more parameters.

47. The assisting UE of claim 41, wherein one of the one or more parameters comprises a subchannel of a PSCCH or PSSCH on which the request to perform the positioning procedure is received.

48. The assisting UE of claim 41, wherein one of the one or more parameters comprises a source identifier of the target UE.

49. The assisting UE of claim 41, wherein one of the one or more parameters comprises a destination identifier of a PSCCH on which the request to perform the positioning procedure is received.

50. The assisting UE of claim 49, wherein the destination identifier is associated with a unicast, a groupcast, or a broadcast.

51. The assisting UE of claim 41, wherein one of the one or more parameters comprises a pseudo-random variable or a scrambling seed.

52. The assisting UE of claim 51, wherein the pseudo-random variable or the scrambling seed is configured by a higher layer of the assisting UE.

53. The assisting UE of claim 41, wherein selection of the one of the one or more parameters is configured by a higher layer of the assisting UE.

54. The assisting UE of claim 41, wherein the request to perform the positioning procedure includes one or more frequency domain allocation fields dedicated for signaling frequency domain resources of the set of time resources, frequency resources, or both.

55. The assisting UE of claim 54, wherein the request to perform the positioning procedure is received via the sidelink in an SCI-2 message.

56. The assisting UE of claim 41, wherein frequency domain allocation fields of a sidelink control information (SCI) channel associated with the request to perform the positioning procedure are used only to schedule frequency domain resources of the set of time resources, frequency resources, or both for the one or more positioning reference signals.

57. The assisting UE of claim 41, wherein:
a first set of frequency domain allocation fields of an SCI channel associated with the request to perform the positioning procedure is used to schedule data, and
a second set of frequency domain allocation fields of the SCI channel associated with the request to perform the positioning procedure is used to schedule frequency domain resources of the set of time resources, frequency resources, or both for the one or more positioning reference signals.

58. The assisting UE of claim 57, wherein the second set of frequency domain allocation fields provide scheduling for the one or more positioning reference signals in a differential manner with respect to scheduling of the data by the first set of frequency domain allocation fields.

59. The assisting UE of claim 41, wherein the request to perform the positioning procedure is received over a physical sidelink control channel (PSCCH), a physical sidelink shared channel (PSSCH) or both of the sidelink.

60. The assisting UE of claim 41, wherein the positioning procedure comprises a round-trip-time (RTT) positioning procedure.

61. A target user equipment (UE), comprising:
a memory;
at least one transceiver; and
at least one processor communicatively coupled to the memory and the at least one transceiver, the at least one processor configured to:
cause the at least one transceiver to transmit a request to perform a positioning procedure to at least one assisting UE over a sidelink between the at least one assisting UE and the target UE, wherein the target UE and the at least one assisting UE are both out of network coverage;
determine, based at least on the request, a set of time resources, frequency resources, or both on which to transmit one or more positioning reference signals to the at least one assisting UE for the positioning procedure, wherein the set of time resources, frequency resources, or both is determined based on a deterministic function of one or more parameters; and
cause the at least one transceiver to transmit the one or more positioning reference signals to the at least one assisting UE via the set of time resources, frequency resources or both.

62. The target UE of claim 61, wherein the at least one processor is further configured to:
cause the at least one transceiver to transmit, via the sidelink, an indication of the set of time resources, frequency resources, or both to the at least one assisting UE.

63. The target UE of claim 62, wherein the at least one processor is further configured to:
derive, before the indication of the set of time resources, frequency resources, or both is transmitted to the at least one assisting UE, the one or more parameters relative to time resources, frequency resources, or both over which the indication of the set of time resources, frequency resources, or both will be transmitted to the at least one assisting UE.

64. The target UE of claim 63, wherein the at least one processor is further configured to:
cause the at least one transceiver to transmit the indication of the set of time resources, frequency resources, or both to the at least one assisting UE in a first sidelink control information (SCI-1) message, a second sidelink control information (SCI-2) message, or both.

65. The target UE of claim 61, wherein the at least one processor is further configured to:
derive the one or more parameters relative to time resources, frequency resources, or both over which the request to perform the positioning procedure is transmitted.

66. The target UE of claim 61, wherein the at least one processor is further configured to:
determine time domain resources of the set of time resources, frequency resources, or both based on the one or more parameters.

67. The target UE of claim 61, wherein one of the one or more parameters comprises a subchannel of a PSCCH or PSSCH on which the request to perform the positioning procedure is transmitted.

68. The target UE of claim 61, wherein one of the one or more parameters comprises a source identifier of the target UE.

69. The target UE of claim 61, wherein one of the one or more parameters comprises a destination identifier of a PSCCH on which the request to perform the positioning procedure is transmitted.

70. The target UE of claim 69, wherein the destination identifier is associated with a unicast, a groupcast, or a broadcast.

71. The target UE of claim 61, wherein one of the one or more parameters comprises a pseudo-random variable or a scrambling seed.

72. The target UE of claim 71, wherein the pseudo-random variable or the scrambling seed is configured by a higher layer of the target UE.

73. The target UE of claim 61, wherein selection of the one of the one or more parameters is configured by a higher layer of the target UE.

74. The target UE of claim 61, wherein the request to perform the positioning procedure includes one or more frequency domain allocation fields dedicated for signaling frequency domain resources of the set of time resources, frequency resources, or both.

75. The target UE of claim 74, wherein the request to perform the positioning procedure is transmitted via the sidelink in an SCI-2 message.

76. The target UE of claim 61, wherein frequency domain allocation fields of a sidelink control information (SCI) channel associated with the request to perform the positioning procedure are used only to schedule frequency domain resources of the set of time resources, frequency resources, or both for the one or more positioning reference signals.

77. The target UE of claim 61, wherein:
a first set of frequency domain allocation fields of an SCI channel associated with the request to perform the positioning procedure is used to schedule data, and
a second set of frequency domain allocation fields of the SCI channel associated with the request to perform the positioning procedure is used to schedule frequency domain resources of the set of time resources, frequency resources, or both for the one or more positioning reference signals.

78. The target UE of claim 77, wherein the second set of frequency domain allocation fields provide scheduling for the one or more positioning reference signals in a differential manner with respect to scheduling of the data by the first set of frequency domain allocation fields.

79. The target UE of claim 61, wherein the request to perform the positioning procedure is received over a physical sidelink control channel (PSCCH), a physical sidelink shared channel (PSSCH), or both of the sidelink.

80. The target UE of claim 61, wherein the positioning procedure comprises a round-trip-time (RTT) positioning procedure.

81. An assisting user equipment (UE), comprising:
means for receiving a request to perform a positioning procedure from a target UE over a sidelink between the assisting UE and the target UE, wherein the assisting UE and the target UE are both out of network coverage;
means for determining, based at least on the request, a set of time resources, frequency resources, or both on which to transmit one or more positioning reference signals for the positioning procedure, wherein the set of time resources, frequency resources, or both is determined based on a deterministic function of one or more parameters; and
means for transmitting the one or more positioning reference signals to the target UE via the set of time resources, frequency resources, or both.

82. A target user equipment (UE), comprising:
means for transmitting a request to perform a positioning procedure to at least one assisting UE over a sidelink between the at least one assisting UE and the target UE, wherein the target UE and the at least one assisting UE are both out of network coverage;
means for determining, based at least on the request, a set of time resources, frequency resources, or both on which to transmit one or more positioning reference signals to the at least one assisting UE for the positioning procedure, wherein the set of time resources, frequency resources, or both is determined based on a deterministic function of one or more parameters; and
means for transmitting the one or more positioning reference signals to the at least one assisting UE via the set of time resources, frequency resources, or both.

83. A non-transitory computer-readable medium storing a set of instructions, the set of instructions comprising one or more instructions that, when executed by one or more processors of an assisting user equipment (UE), cause the assisting UE to:
receive a request to perform a positioning procedure from a target UE over a sidelink between the assisting UE and the target UE, wherein the assisting UE and the target UE are both out of network coverage;
determine, based at least on the request, a set of time resources, frequency resources, or both on which to transmit one or more positioning reference signals for the positioning procedure, wherein the set of time resources, frequency resources, or both is determined based on a deterministic function of one or more parameters; and
transmit the one or more positioning reference signals to the target UE via the set of time resources, frequency resources, or both.

84. A non-transitory computer-readable medium storing a set of instructions, the set of instructions comprising one or more instructions that, when executed by one or more processors of a target user equipment (UE), cause the target UE to:
transmit a request to perform a positioning procedure to at least one assisting UE over a sidelink between the at least one assisting UE and the target UE, wherein the target UE and the at least one assisting UE are both out of network coverage;
determine, based at least on the request, a set of time resources, frequency resources, or both on which to transmit one or more positioning reference signals to the at least one assisting UE for the positioning procedure, wherein the set of time resources, frequency resources, or both is determined based on a deterministic function of one or more parameters; and
transmit the one or more positioning reference signals to the at least one assisting UE via the set of time resources, frequency resources, or both.

* * * * *